United States Patent
Imoto et al.

(10) Patent No.: US 9,891,707 B2
(45) Date of Patent: Feb. 13, 2018

(54) INFORMATION PROCESSING DEVICE, INFORMATION PROCESSING METHOD, AND PROGRAM FOR CONTROLLING A STATE OF AN APPLICATION BY GAZE POSITION

(71) Applicant: SONY CORPORATION, Tokyo (JP)

(72) Inventors: Maki Imoto, Tokyo (JP); Jun Kimura, Kanagawa (JP); Tsubasa Tsukahara, Tokyo (JP); Ayumi Kato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/024,135

(22) PCT Filed: Aug. 4, 2014

(86) PCT No.: PCT/JP2014/070439
§ 371 (c)(1),
(2) Date: Mar. 23, 2016

(87) PCT Pub. No.: WO2015/064165
PCT Pub. Date: May 7, 2015

(65) Prior Publication Data
US 2016/0239081 A1 Aug. 18, 2016

(30) Foreign Application Priority Data
Nov. 1, 2013 (JP) .................................. 2013-227938

(51) Int. Cl.
*G09G 5/00* (2006.01)
*G06F 3/01* (2006.01)
(Continued)

(52) U.S. Cl.
CPC .............. *G06F 3/013* (2013.01); *G06F 3/017* (2013.01); *G06F 3/0481* (2013.01); *G06F 3/04817* (2013.01); *G06F 3/04845* (2013.01)

(58) Field of Classification Search
CPC ...... G06F 3/013; G06F 3/04845; G06F 3/017; G06F 3/0481; G06F 3/04817
See application file for complete search history.

(56) References Cited

U.S. PATENT DOCUMENTS 4,973,149 A * 11/1990 Hutchinson ............ A61B 3/113 351/210
6,152,563 A * 11/2000 Hutchinson ............ A61B 3/113 351/209

(Continued)

FOREIGN PATENT DOCUMENTS

JP 10-260773 9/1998
JP 2000-330681 11/2000
(Continued)

*Primary Examiner* — Rodney Amadiz
(74) *Attorney, Agent, or Firm* — Paratus Law Group, PLLC

(57) ABSTRACT

There is provided an information processing device including: a gaze position acquisition unit configured to acquire a gaze position of a user; a determination unit configured to determine whether the acquired gaze position corresponds to an application-related position; and a processing unit configured, when the gaze position is determined to correspond to the application-related position, to control a state of an application.

14 Claims, 12 Drawing Sheets

(51) Int. Cl.
    *G06F 3/0481*     (2013.01)
    *G06F 3/0484*     (2013.01)

(56) References Cited

U.S. PATENT DOCUMENTS

| | | | | |
|---|---|---|---|---|
| 8,289,315 B2* | 10/2012 | Kondo | ............... | G06F 3/013 |
| | | | | 345/418 |
| 9,164,582 B2* | 10/2015 | Seki | ............... | G06F 3/013 |
| 9,761,196 B2* | 9/2017 | Saito | ............... | G09G 5/00 |
| 2013/0321265 A1* | 12/2013 | Bychkov | ............... | G06F 3/017 |
| | | | | 345/156 |
| 2014/0361971 A1* | 12/2014 | Sala | ............... | G06F 3/041 |
| | | | | 345/156 |
| 2015/0301595 A1* | 10/2015 | Miki | ............... | A61B 3/113 |
| | | | | 715/847 |

FOREIGN PATENT DOCUMENTS

| | | |
|---|---|---|
| JP | 2005-100366 | 4/2005 |
| JP | 2009-251658 | 10/2009 |
| WO | WO2013/006518 A2 | 1/2013 |

\* cited by examiner

FIG. 6
A
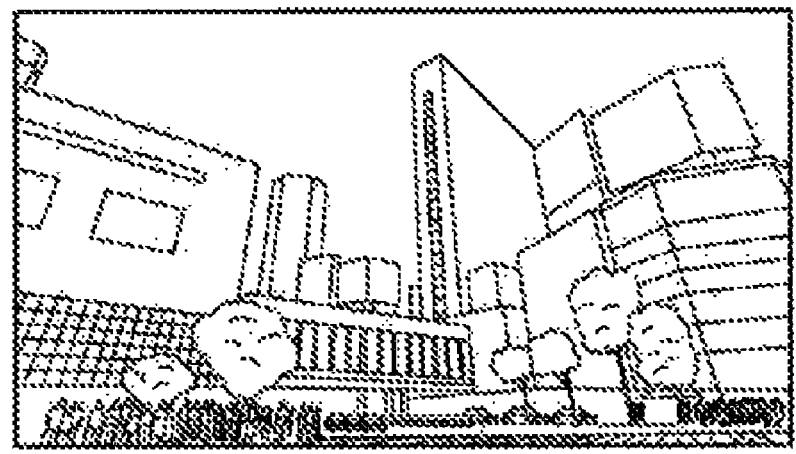
B
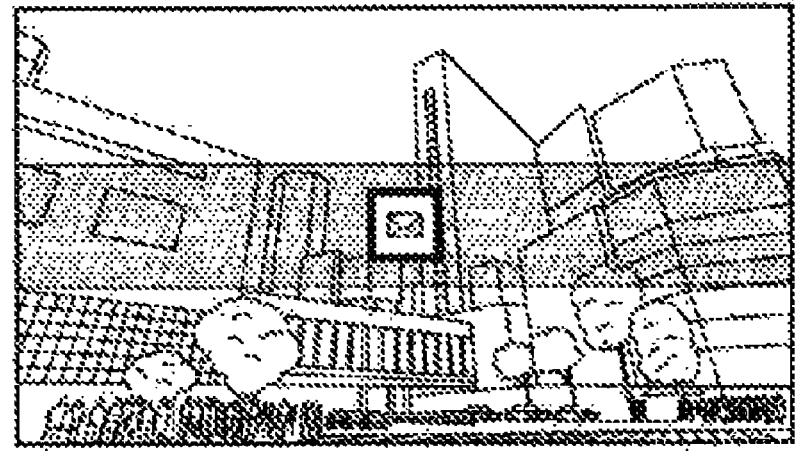

INFORMATION PROCESSING DEVICE, INFORMATION PROCESSING METHOD, AND PROGRAM FOR CONTROLLING A STATE OF AN APPLICATION BY GAZE POSITION

CROSS REFERENCE TO PRIOR APPLICATION

This application is a National Stage Patent Application of PCT International Patent Application No. PCT/JP2014/070439 (filed on Aug. 4, 2014) under 35 U.S.C. §371, which claims priority to Japanese Patent Application No. 2013-227938 (filed on Nov. 1, 2013), which are all hereby incorporated by reference in their entirety.

TECHNICAL FIELD

The present disclosure relates to an information processing device, an information processing method, and a program.

BACKGROUND ART

Technologies that allow a user to perform an operation with the movement of his eyes using a gaze detection technique such as eye-tracking technology have been recently developed. A technology that allows a user to perform an operation with the movement of his eyes includes the technique disclosed in Patent Literature 1 below.

CITATION LIST

Patent Literature

Patent Literature 1: JP 2009-251658A

SUMMARY OF INVENTION

Technical Problem

For example, when the technique disclosed in Patent Literature 1 is employed, the user can select one of menu items that are displayed by performing blinking in the state in which the user gazes at the item. However, for example, when the technique disclosed in Patent Literature 1 is employed, it will be necessary to perform an operation using another operation system such as button operations as well as an operation using the movement of the eyes.

In the present disclosure, there is provided a novel and improved information processing device, information processing method, and program, which allow the user to perform an application-related operation using the gaze.

Solution to Problem

According to the present disclosure, there is provided an information processing device including: a gaze position acquisition unit configured to acquire a gaze position of a user; a determination unit configured to determine whether the acquired gaze position corresponds to an application-related position; and a processing unit configured, when the gaze position is determined to correspond to the application-related position, to control a state of an application.

According to the present disclosure, there is provided an information processing method that is executed by an information processing device, the information processing method including: a step of acquiring a gaze position of a user; a step of determining whether the acquired gaze position corresponds to an application-related position; and a step of controlling, when the gaze position is determined to correspond to the application-related position, a state of an application.

According to the present disclosure, there is provided a program for causing a computer to execute: a step of acquiring a gaze position of a user; a step of determining whether the acquired gaze position corresponds to an application-related position; and a step of controlling, when the gaze position is determined to correspond to the application-related position, a state of an application.

Advantageous Effects of Invention

According to the present disclosure, it is possible to allow the user to perform an application-related operation using the gaze.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 6 is an explanatory diagram illustrated to describe an exemplary process of implementing the information processing method according to the present embodiment.

DESCRIPTION OF EMBODIMENTS

Figure 1:
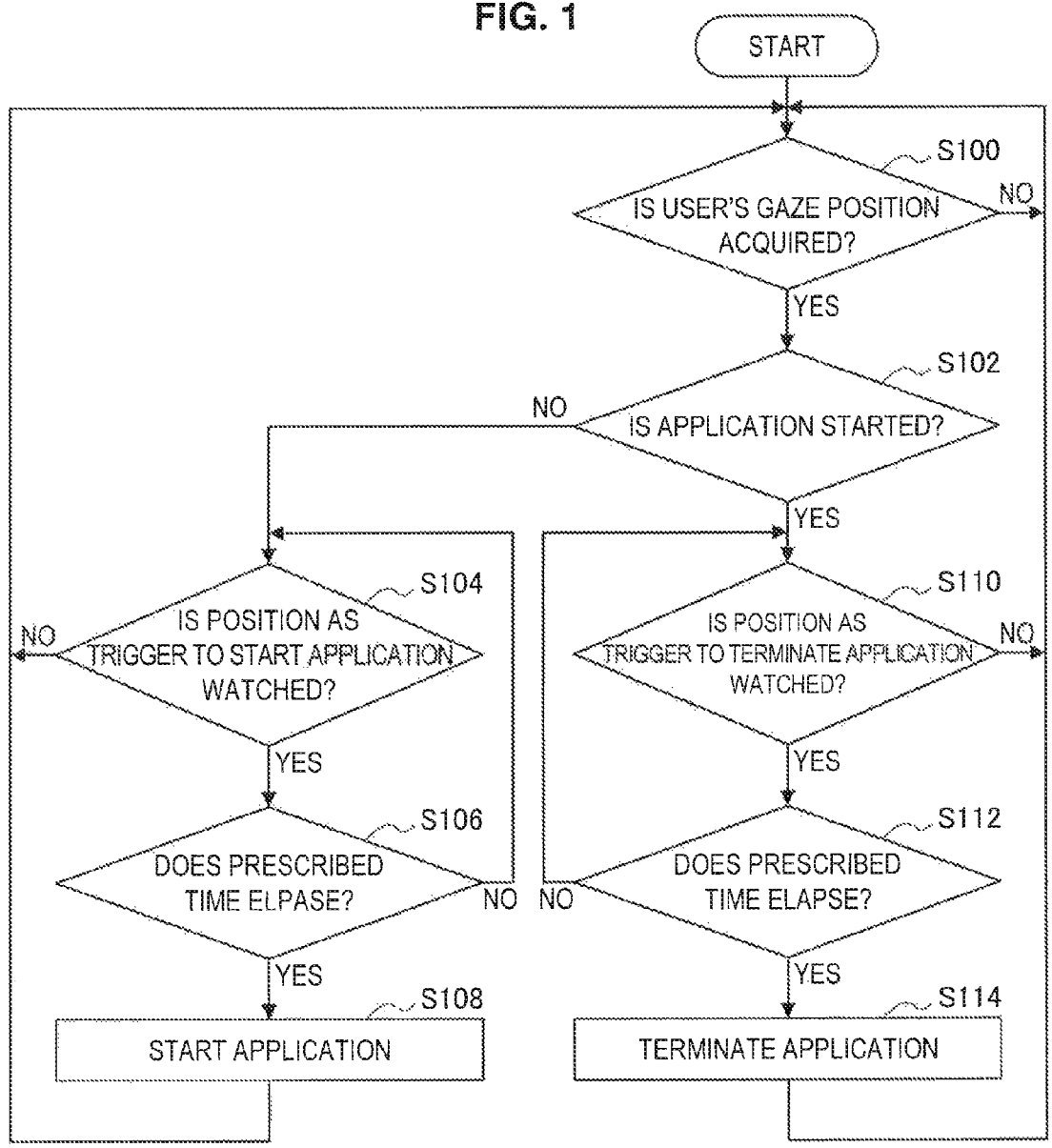
FIG. 1 is a flowchart illustrated to describe a first example of a process of implementing an information processing method according to a present embodiment.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be described in the following order.

1. Information processing method according to present embodiment
2. Information processing device according to present embodiment
3. Program according to present embodiment Information Processing Method According to Present Embodiment Prior to description of the configuration of an information processing device according to the present embodiment, an information processing method according to the present embodiment will be first described. In the following, the information processing method according to the present embodiment is described by taking as an example the case where the information processing device according to the present embodiment performs a process of implementing the information processing method according to the present embodiment.

[1] Overview of Process of Implementing Information Processing Method According to Present Embodiment In some cases for example, the user wants to perform an operation only using the gaze, as follows:

Case where the user wears a see-through or closed-view head mounted display (hereinafter referred to as "HMD")

Case where the user does not use one or both hands when the user wants to operate a portable device such as a tablet device or communication device including mobile phones and smartphones (e.g. when the user is cooking or other like situations)

Case where the user wants to operate a computer such as personal computers (PCs) or a device such as television sets having a display screen larger than the portable device mentioned above, or case where the user and the device are away from each other or the user and a remote controller that can be used to operate the device are away from each other.

Thus, the information processing device according to the present embodiment performs a process of implementing the information processing method according to the present embodiment, for example, (1) gaze position acquisition process, (2) determination process, and (3) state control process, as described below, to allow the user to perform an application-related operation using the gaze without the necessity of an operation using other operation systems such as operations on buttons. In the following, for convenience of description, the process of item (2) (determination process) and the process of item (3) (state control process) will be described together.

When the process of implementing the information processing method according to the present embodiment is performed, for example, it may be possible for the user to further perform an operation by gesture or an operation on buttons. In other words, the process of implementing the information processing method according to the present embodiment allows the user to perform an application-related operation using the gaze without the necessity of an operation using other operation systems such as operations on buttons. However, the operation to be performed by the information processing method according to the present embodiment may be, for example, a non-exclusive operation to the operation by the other operation systems.

(1) Gaze Position Acquisition Process

The information processing device according to the present embodiment acquires, for example, a user's gaze position. For example, the information processing device according to the present embodiment acquires information relating to a user's gaze position and specifies the user's gaze position based on the acquired information relating to the user's gaze position, thereby acquiring the user's gaze position.

Furthermore, when a plurality of users are present, the information processing device according to the present embodiment acquires, for example, the gaze position for each user based on the information relating to the user' gaze position according to the present embodiment for each user. In addition, in the information processing device according to the present embodiment or an external device, when the user is specified using face recognition or the like, the information processing device can acquire, for example, the gaze position of a particular user.

In this regard, the information relating to the user's gaze position according to the present embodiment may be, for example, data indicating the position of the user's gaze or data that can be used in specifying the position of the user's gaze (or data that can be used in estimating the position of the user's gaze, and this is similarly applied to the following description).

Examples of the data indicating the position of the user's gaze according to the present embodiment include "coordinate data indicating the position of the user's gaze in a display screen". The position of the user's gaze on the display screen is represented by, for example, coordinates in a coordinate system whose origin is the reference position on the display screen. The reference position in the display screen according to the present embodiment may be, for example, a preset fixed position or may be a position that can be set based on the user's operation or the like.

When the coordinate data indicating the position of the user's gaze on the display screen is used as the information relating to the position of the user's gaze according to the present embodiment, the information processing device according to the present embodiment acquires the user's gaze position by specifying the position of the user's gaze on the display screen using the coordinate data, which indicates the position of the user's gaze on the display screen and is obtained from an external device that specifies (or estimates) the position of the user's gaze using the gaze detection technology.

In this regard, for example, it is possible to specify the position of the user's gaze on the display screen by using the gaze that is detected using the gaze detection technology and by using the user's position, the orientation of the face, or the like with respect to the display screen, which is detected from a captured image obtained by capturing the direction in which an image (moving image or still image) is displayed on the display screen. The direction in which an image is displayed on the display screen according to the present embodiment is, for example, the direction in the display screen of the side in which the user views an image that is displayed on the display screen. The method of specifying the position of the user's gaze on the display screen according to the present embodiment is not limited thereto. For example, it is possible for the information processing device according to the present embodiment or an external device to use any technology that can specify the position of the user's gaze on the display screen.

Furthermore, examples of the gaze detection technology according to the present embodiment include a method of detecting the gaze based on the position of a moving point of the eye (e.g. a point corresponding to a movable portion in the eye such as iris and pupil) with respect to the reference point of the eye (e.g. a point corresponding to an immovable portion in the eye such as the inner corner and corneal reflection). The gaze detection technology according to the present embodiment is not limited thereto. For example, it is possible for the information processing device according to the present embodiment or an external device to detect the user's gaze using any gaze detection technology, which uses "corneal reflection technique", "pupil corneal reflection technique", "scleral reflection technique", "an active appearance model (AAM) that tracks feature points obtained from eyes, nose, mouth, or the like after the face is detected", or the like.

The data indicating the position of the user's gaze according to the present embodiment is not limited to the "coordinate data indicating the position of the user's gaze on the display screen" described above.

For example, in the case where the user wears a see-through HMD, the data indicating the position of the user's gaze according to the present embodiment may be "coordinate data indicating the position in a real object in the real space viewed by the user."

The position in a real object in the real space viewed by the user is specified (or estimated), for example, based on a three-dimensional image of a real object and a gaze vector specified (or estimated) using the gaze detection technology. The method of specifying the position in a real object in the real space viewed by the user is not limited thereto, and it is possible to use any technology that can specify the position in a real object in the real space viewed by the user.

When the coordinate data indicating the position in a real object in the real space viewed by the user is used as the information relating to the position of the user's gaze according to the present embodiment, the information processing device according to the present embodiment acquires the user's gaze position, for example, by specifying the position of the user's gaze in the real object using coordinate data that indicates the position in a real object in the real space viewed by the user and is obtained from an external device.

Furthermore, examples of data that can be used in specifying the position of the user's gaze according to the present embodiment include a captured image data that is obtained by capturing the direction in which an image is displayed on a display screen. In addition, the data that can be used in specifying the position of the user's gaze according to the present embodiment may further include detection data obtained by any sensor, which obtains a detection value that can be used to improve the estimation accuracy of the position of the user's gaze, such as detection data obtained by infrared sensor for detecting infrared light in the direction in which an image is displayed on the display screen.

Furthermore, the data that can be used in specifying the position of the user's gaze according to the present embodiment may be, for example, data for specifying a three-dimensional image of a real object and a gaze vector of the user.

When the data that can be used in specifying the position of the user's gaze is used as the information relating to the position of the user's gaze according to the present embodiment, the information processing device according to the present embodiment uses, for example, the captured image data obtained from an imaging unit (described later) provided in its own device (information processing device according to the present embodiment, and this is similarly applied to the following description) or external imaging device. Additionally, in the above case, the information processing device according to the present embodiment may use, for example, detection data (an example of data that can be used in specifying the position of the user's gaze) that is obtained from a sensor, which can be used to improve the estimation accuracy of the position of the user's gaze and is provided in its own device, or an external sensor.

In addition, when the data that can be used in specifying the position of the user's gaze is used as the information relating to the position of the user's gaze according to the present embodiment, the information processing device according to the present embodiment is also possible to use, for example, data for specifying a three-dimensional image stored in a storage unit (described later) provided in its own device or an external storage medium and a user's gaze vector of the captured image data or the like that is captured by an imaging unit (described later) or the like.

For example, when the data that can be used in specifying the position of the user's gaze is used, the information processing device according to the present embodiment performs, for example, a process of implementing the method of specifying the position of the user's gaze according to the present embodiment as described above and specifies the position of the user's gaze, thereby acquiring the user's gaze position.

(2) Determination Process and (3) State Control Process

The information processing device according to the present embodiment determines, for example, whether the gaze position acquired by the process of the above item (1) (gaze position acquisition process) corresponds to the application-related position (determination process). Then, the information processing device according to the present embodiment, when the gaze position is determined to correspond to the application-related position in the determination process according to the present embodiment, controls the state of the application (state control process). In the state control process according to the present embodiment, the information processing device according to the present embodiment controls the state of the application, for example, by generating various instructions (e.g. start instruction and termination instruction, which will be described later) for controlling the state of the application and by executing a relevant instruction or causing an external device to execute the relevant instruction.

In this regard, examples of the application-related position according to the present embodiment include "a position for starting the application" (hereinafter sometimes referred to as "first position") and "a position for terminating the application being started" (hereinafter sometimes referred to as "second position").

The application-related position according to the present embodiment is not limited to the first position and the second position described above. Other examples of the application-related position according to the present embodiment will be described later.

Furthermore, examples of the application-related position according to the present embodiment include a position that is included in a predetermined region. In addition, for example, the application-related position according to the present embodiment may be a preset fixed position or may be varied based on the user's operation or the like.

In the determination process according to the present embodiment, for example, when coordinates indicated by the gaze position coincide with one or more coordinates included in the predetermined region, the information processing device according to the present embodiment determines that the gaze position corresponds to the application-related position. In other words, the predetermined region according to the present embodiment may be one point on the display screen and the like or may include a plurality of points on the display screen and the like.

Furthermore, in the state control process according to the present embodiment, when multiple controllable applications are present, the application-related position according to the present embodiment is set, for example, for each application. In this regard, in the case where a plurality of controllable applications are present in the state control process according to the present embodiment, the application-related position according to the present embodiment may be different for each application or may be common to some or all of the applications.

(i) First example of determination process and state control process: process related to first position (position for starting application)

The information processing device according to the present embodiment determines, for example, whether the gaze position corresponds to the first position (determination process). In addition, when the first position is set for each application, the information processing device according to the present embodiment determines, for example, whether the gaze position corresponds to the first position for each first position being set.

In this regard, for example, when the coordinates indicated by the gaze position coincide with the coordinates corresponding to the first position, the information processing device according to the present embodiment determines whether the gaze position corresponds to the first position.

Then, the information processing device according to the present embodiment, for example, when the gaze position is determined to correspond to the first position in the determination process according to the present embodiment, starts the application corresponding to the determined first position (state control process).

Thus, the information processing device according to the present embodiment allows, for example, the user to start the application using the gaze (an example of the application-related operation using the gaze) by performing the determination process and the state control process according to the first example based on the gaze position acquired by the process of the above item (1) (gaze position acquisition process).

(ii) Second example of determination process and state control process: process related to second position (position for terminating application being started)

In the case where the application is started, for example, by the state control process or the like according to the first example disclosed in the above item (1), the information processing device according to the present embodiment determines, for example, whether the gaze position corresponds to the second position corresponding to the application being started (determination process). In addition, when the second position is set for each application, the information processing device according to the present embodiment determines, for example, whether the gaze position corresponds to the second position for each second position being set.

Then, for example, if the gaze position corresponds to the second position in the determination process according to the present embodiment, the information processing device according to the present embodiment terminates the application corresponding to the determined second position (state control process).

Thus, the information processing device according to the present embodiment allows, for example, the user to terminate the application using the gaze (an example of the application-related operation using the gaze) by performing the determination process and the state control process according to the second example based on the gaze position that is acquired by the process of the above item (1) (gaze position acquisition process).

(iii) Third example of determination process and state control process

It is also possible for the information processing device according to the present embodiment to perform, for example, a combination process of "the determination process and state control process according to the first example described above", and "the determination process and state control process according to the second example described above."

The information processing device according to the present embodiment can achieve "starting or termination of the application by the user while the user is viewing the position being set", for example, by performing "the determination process and state control process according to the first example described above" through "the determination process and state control process according to the third example described above", based on the gaze position that is acquired by the process of the above item (1) (gaze position acquisition process).

The determination process according to the present embodiment and the state control process according to the present embodiment are not limited to the examples described above.

For example, the information processing device according to the present embodiment may further determine whether an object associated with the application is displayed (hereinafter referred to as a "display object") in the determination process according to the present embodiment. In determining whether an object associated with the application is displayed, the information processing device according to the present embodiment performs a process depending on a result obtained by determining whether an object associated with the application is displayed (another example of the determination process according to the present embodiment and the state control process according to the present embodiment as described later).

In this regard, examples of the display object according to the present embodiment include any object that can be displayed and associated with the application, such as icon, button, and link associated with the application. In the following, the description will be given taking as an example the case where the display object according to the present embodiment is an icon.

The information processing device according to the present embodiment displays, for example, the display object on a display screen of a display unit (described later) that is provided in its own device or a display screen of an external display device.

In further determining whether the display object is displayed in the determination process according to the present embodiment, examples of the application-related position according to the present embodiment include a position as follows:

Position for displaying the display object (hereinafter sometimes referred to as "third position")

Position for starting the application associated with the display object being displayed (hereinafter sometimes referred to as "fourth position")

Position for moving the display object being displayed (hereinafter sometimes referred to as "fifth position")

Position for hiding the display object being displayed (hereinafter sometimes referred to as "sixth position")

Another example of the determination process according to the present embodiment and the state control process according to the present embodiment according to the present embodiment will be described in the case when it is further determined whether the display object is displayed in the determination process according to the present embodiment.

(iv) Fourth example of determination process and state control process

For example, if it is not determined that the display object is displayed, the information processing device according to the present embodiment determines whether the gaze position corresponds to the third position (position for displaying the object) (determination process).

In this regard, examples of the third position according to the present embodiment include a position included in the predetermined region, similarly to the application-related position according to the present embodiment described above. In addition, the position for displaying the object according to the present embodiment may be a preset fixed position or may be varied based on the user's operation or the like.

For example, when the coordinates indicated by the gaze position coincide with one or more coordinates included in the predetermined region in the determination process according to the present embodiment, the information processing device according to the present embodiment determines that the gaze position corresponds to the position for displaying the object.

Furthermore, when a plurality of controllable applications are present in the state control process according to the present embodiment, the third position according to the present embodiment is set for each display object corresponding to each of a plurality of applications. In this regard, when a plurality of controllable applications are present in the state control process according to the present embodiment, the position for displaying the object according to the present embodiment may be different for each display object or may be common to some or all of the display objects.

In the determination process according to the present embodiment, if it is determined that the gaze position corresponds to the third position, the information processing device according to the present embodiment displays the display object corresponding to the third position (state control process).

The determination process and the state control process according to the fourth example allow, for example, the information processing device according to the present embodiment to display the display object as described above.

Furthermore, for example, if it is determined that the display object is displayed, the information processing device according to the present embodiment determines whether the gaze position corresponds to the fourth position (position for starting the application associated with the display object being displayed) (determination process). In this regard, the information processing device according to the present embodiment determines, for example, that the gaze position corresponds to the fourth position when the coordinates indicated by the gaze position coincide with the coordinates corresponding to the fourth position.

Then, for example, in the determination process according to the present embodiment, if it is determined that the gaze position corresponds to the fourth position, the information processing device according to the present embodiment starts the application corresponding to the determined fourth position (state control process).

Thus, the information processing device according to the present embodiment allows the user to start the application using the gaze (an example of the application-related operation using the gaze) by performing the determination process and the state control process according to the fourth example based on the gaze position that is acquired by the process of the above item (1) (gaze position acquisition process).

(v) Fifth example of determination process and state control process: process related to change of display object In the determination process according to the present embodiment, if it is further determined whether the display object is displayed, the information processing device according to the present embodiment can change, for example, the display object being displayed.

More specifically, for example, when the gaze position corresponds to the display position of the display object being displayed, the information processing device according to the present embodiment displays another display object associated with another application instead of the display object being displayed (state control process).

Furthermore, for example, in the determination process according to the present embodiment, if it is not determined that the gaze position corresponds to the fourth position in determining whether the gaze position corresponds to the fourth position, the information processing device according to the present embodiment may display another display object associated with another application at every predetermined time instead of the display object being displayed (state control process).

In this regard, examples of the other display object that is displayed instead of the display object being displayed include a display object corresponding to the application selected in accordance with a predetermined rule or order. In addition, the information processing device according to the present embodiment selects, for example, an application randomly and may display a display object corresponding to the selected application instead of the display object being displayed.

Furthermore, examples of the predetermined time according to the present embodiment include a preset fixed time or a time that can be changed based on the user's operation or the like. In addition, for example, the predetermined time according to the present embodiment may be a prescribed time or may be an unfixed time in accordance with a predetermined rule.

Thus, the information processing device according to the present embodiment allows the user to change the display object using the gaze (an example of the application-related operation using the gaze) by performing the determination process and the state control process according to the fifth example based on the gaze position that is acquired by the process of the above item (1) (gaze position acquisition process). A specific example of the change of the display object being displayed according to the present embodiment will be described later.

(vi) Sixth example of determination process and state control process: process related to movement of display object In the determination process according to the present embodiment, if it is further determined whether the display object is displayed, for example, the information processing device according to the present embodiment can also move the display object being displayed based on the gaze position.

More specifically, for example, if it is determined that the display object is displayed, the information processing device according to the present embodiment determines whether the gaze position corresponds to the fifth position (position for moving the display object being displayed). In this regard, for example, when the coordinates indicated by the gaze position coincide with the coordinates corresponding to the fifth position, the information processing device according to the present embodiment determines that the gaze position corresponds to the fifth position.

Then, for example, in the determination process according to the present embodiment, if it is determined that the gaze position corresponds to the fifth position, the information processing device according to the present embodiment moves the display object being displayed using a movement method associated with the fifth position (state control process). In this regard, the movement method associated with the fifth position according to the present embodiment may be a method in which a moving direction, moving speed, or the like is set in advance, or may be a method in which a moving direction, moving speed, or the like is set based on the user's operation or the like.

Thus, the information processing device according to the present embodiment allows the user to move the display object using the gaze (an example of the application-related operation using the gaze) by performing the determination process and the state control process according to the sixth example based on the gaze position that is acquired by the process of the above item (1) (gaze position acquisition process). A specific example of the movement based on the gaze position of the display object being displayed according to the present embodiment will be described later.

(vii) Seventh example of determination process and state control process: process for hiding display object In the determination process according to the present embodiment, if it is further determined whether the display object is displayed, for example, the information processing device according to the present embodiment can also hide the display object being displayed.

More specifically, for example, in the determination process according to the present embodiment, if it is determined that the display object is displayed, the information processing device according to the present embodiment determines whether the gaze position corresponds to the sixth position (position for hiding the display object being displayed). In this regard, for example, when the coordinates indicated by the gaze position coincide with the coordinates corresponding to the sixth position, the information processing device according to the present embodiment determines that the gaze position corresponds to the sixth position.

Then, for example, in the determination process according to the present embodiment, if it is determined that the gaze position corresponds to the sixth position, the information processing device according to the present embodiment hides the display object being displayed.

Thus, the information processing device according to the present embodiment allows the user to hide the display object being displayed using the gaze (an example of the application-related operation using the gaze) by performing the determination process and the state control process according to the seventh example based on the gaze position that is acquired by the process of the above item (1) (gaze position acquisition process). A specific example of the movement based on the gaze position of the display object being displayed according to the present embodiment will be described later.

(viii) Eighth example of determination process and state control process

The information processing device according to the present embodiment can also perform, for example, a combination process of "the determination process and state control process according to the fourth example described above" and one or more processes among "the determination process and state control process according to the fifth example described above" through "the determination process and state control process according to the seventh example described above."

The information processing device according to the present embodiment can perform, for example, "the determination process and state control process according to the fourth example described above" through "the determination process and state control process according to the eighth example described above", based on the gaze position that is acquired by the process of the above item (1) (gaze position acquisition process), and thus can achieve, for example, those described below.

Viewing of the position being set by the user allows an icon associated with the application (an example of the display object and this is similarly applied to the following description) to be displayed Continuous viewing of the icon by the user allows the icon to be switched to another icon associated with another application Viewing the icon by the user in a different direction from the initial viewing direction allows the icon currently displayed to be moved to a position in the other direction Viewing of the position being set by the user allows the application associated with the icon to be started The information processing device according to the present embodiment performs, for example, the process of the above item (1) (gaze position acquisition process), the process of the above item (2) (determination process), and the process of the above item (3) (state control process), as the process of implementing the information processing method according to the present embodiment. In this regard, the information processing device according to the present embodiment controls the state of the application by performing the process of the above item (2) (determination process) and the process of the above item (3) (state control process) based on the gaze position that is acquired by the process of the above item (1) (gaze position acquisition process).

Thus, the information processing device according to the present embodiment allows the user to perform the application-related operation using the gaze, for example, by performing the process of the above item (1) (gaze position acquisition process), the process of the above item (2) (determination process), and the process of the above item (3) (state control process), as the process of implementing the information processing method according to the present embodiment.

The information processing device according to the present embodiment can perform the process of implementing the information processing method according to the present embodiment, and thus advantageous effects can be achieved as described below.

- For example, in some cases, such as when the user's hands are full, when the user's hands are dirty, when it is troublesome for the user to stretch his hand, or when the user wears a see-through HMD or a closed-view HMD, the user can start or terminate the application and can select a desired one from the menu only by the gaze without using a gesture, button operations, or the like. Thus, it is possible to reduce the inconvenience and to improve the usability and convenience of the user.
- In case where the voice recognition or the like is not possible to be performed (e.g. when the user is in a situation that it is difficult to speak), the user can perform operations to cause trouble to others.

[2] Specific Example of Process of Implementing Information Processing Method According to Present Embodiment A specific example of the process of implementing the information processing method according to the present embodiment will be described.

(I) First example of process of implementing information processing method according to present embodiment FIG. 1 is a flowchart illustrated to describe a first example of the process of implementing the information processing method according to the present embodiment. In this description, the first example of the process of implementing the information processing method according to the present embodiment illustrated in FIG. 1 corresponds to an example of a process in the case where the information processing device according to the present embodiment performs the process of the above item (1) (gaze position acquisition process) and "the determination process and the state control process according to the third example described above." In FIG. 1, for example, processes of steps S100 to S106, S110, and S112 correspond to an example of the process of the above item (2) (determination process), and processes of steps S108 and S114 correspond to an example of the process of the above item (3) (state control process). In FIG. 1, although the process of the above item (1) (gaze position acquisition process) is omitted, the process of the above item (1) (gaze position acquisition process) is performed, for example, constantly, or at regular or irregular intervals.

The information processing device according to the present embodiment determines whether the user's gaze position is acquired (S100). The user's gaze position is acquired, for example, through the process of the above item (1) (gaze position acquisition process).

If it is not determined in step S100 that the gaze position is acquired, the information processing device according to the present embodiment does not proceed to the next step until it is determined that the gaze position is acquired.

Furthermore, if it is determined in step S100 that the gaze position is acquired, the information processing device according to the present embodiment determines whether the application is started (S102).

If it is not determined in step S102 that the application is started, the information processing device according to the present embodiment determines whether a position as a trigger to start the application is watched (S104).

An Example of the position as a trigger to start the application according to the present embodiment includes examples described below. In this description, the position as a trigger to start the application according to the present embodiment corresponds to the first position according to the present embodiment. It should be understood that the position as a trigger to start the application according to the present embodiment is not limited to examples described below.

- In the region on the display screen within 5 cm from the left end as viewed from the user who is viewing the display screen
- In the rightmost region of the display screen as viewed from the user who is viewing the display screen when the display screen is divided into three screens in the horizontal direction
- In the region that is set for each application, such as in the lower left region of the display screen as viewed from the user who is viewing the display screen for the application related to imaging and in the lower right region of the display screen as viewed from the user who is viewing the display screen for the application related to voice recognition If it is not determined in step S104 that a position as a trigger to start the application is watched, the information processing device according to the present embodiment repeats, for example, the processes from step S100.

In addition, if it is determined in step S104 that a position as a trigger to start the application is watched, the information processing device according to the present embodiment determines, for example, whether a prescribed time elapses (S106). In this description, the prescribed time according to the present embodiment may be a preset fixed time or a time that can be changed based on the user's operation or the like (this is similarly applied to the following description).

The process of step S106 is performed, for example, based on the value of a counter. The value of the counter is updated, for example, when it is determined that the position as a trigger to start the application is watched in the process of step S104. In addition, the value of the counter is reset, for example, when it is not determined that the position as a trigger to start the application is watched in the process of step S104 or when a process of step S108 described later is performed. The process of the determination in step S106 is not limited to the example of using the counter, but the information processing device according to the present embodiment is possible, for example, to use any method that can perform the determination in step S106.

The gaze movement is fast, and thus when the user is allowed to perform the application-related operation using the gaze, an erroneous operation may be likely to occur. In this regard, the information processing device according to the present embodiment prevents the erroneous operation, for example, by determining whether the user's gaze is fixed on the position as a trigger to start the application during the prescribed time that is set in step S106 (e.g. 300 msec through 1000 msec).

The method of preventing erroneous operations according to the present embodiment is not limited to the method for the process of step S106.

For example, examples of the method of preventing erroneous operations according to the present embodiment include methods as described below.

- Method of finding a point at which the user is viewing using three-dimensional coordinates
- Method of determining whether the user is viewing intentionally Method of further combining the user's intentional behaviors (e.g. predetermined gestures such as nodding motion) in addition to the method using the gaze When "the method of finding a point at which the user is viewing using three-dimensional coordinates" is used, the information processing device according to the present embodiment determines whether the user is viewing the position as a trigger to start the application, for example, by calculating the convergence angle composed of the both eyes of the user and the gazing point and by finding a point at which the user is viewing using the three-dimensional coordinates. In addition, when "the method of determining whether the user is viewing intentionally" is used, the information processing device according to the present embodiment determines whether the user's gaze is intended, for example, by the use of biometric information or by learning the eye of the user when the user is viewing a point unintentionally (e.g. it corresponds to the case where the user looks vacantly) using the machine learning.

In the following, when the process of determining whether a prescribed time elapses is performed, the information processing device according to the present embodiment can determine whether the prescribed time elapses, for example, by performing a process similar to the process of step S106. Thus, in the following, the description of the process of determining whether the prescribed time elapses will be omitted.

Furthermore, for example, when the method related to prevention of erroneous operations is used or when another method related to prevention erroneous operations is used, it is also possible for the information processing device according to the present embodiment not to perform the process of step S106 or the process of determining whether a prescribed time elapses as described below.

If it is not determined in step S106 that the prescribed time elapses, the information processing device according to the present embodiment repeats, for example, the processes from step S104.

Furthermore, if it is determined in step S106 that the prescribed time elapses, the information processing device according to the present embodiment starts the application (S108). Then, the information processing device according to the present embodiment repeats the processes from step S100.

In this description, the information processing device according to the present embodiment starts, for example, an application associated with the position as a trigger to start the application in step S108. The information processing device according to the present embodiment starts the application, for example, by generating a start instruction to start the application and by executing the start instruction or by causing an external device to execute the start instruction.

Furthermore, examples of the application started in step S108 include an application described below. It should be understood that an example of the application started in step S108 is not limited to the examples described below.

Imaging application

Voice recognition application

Application related to notification (e.g. application for displaying a notification list, application associated with notification, or the like)

Figure 2:
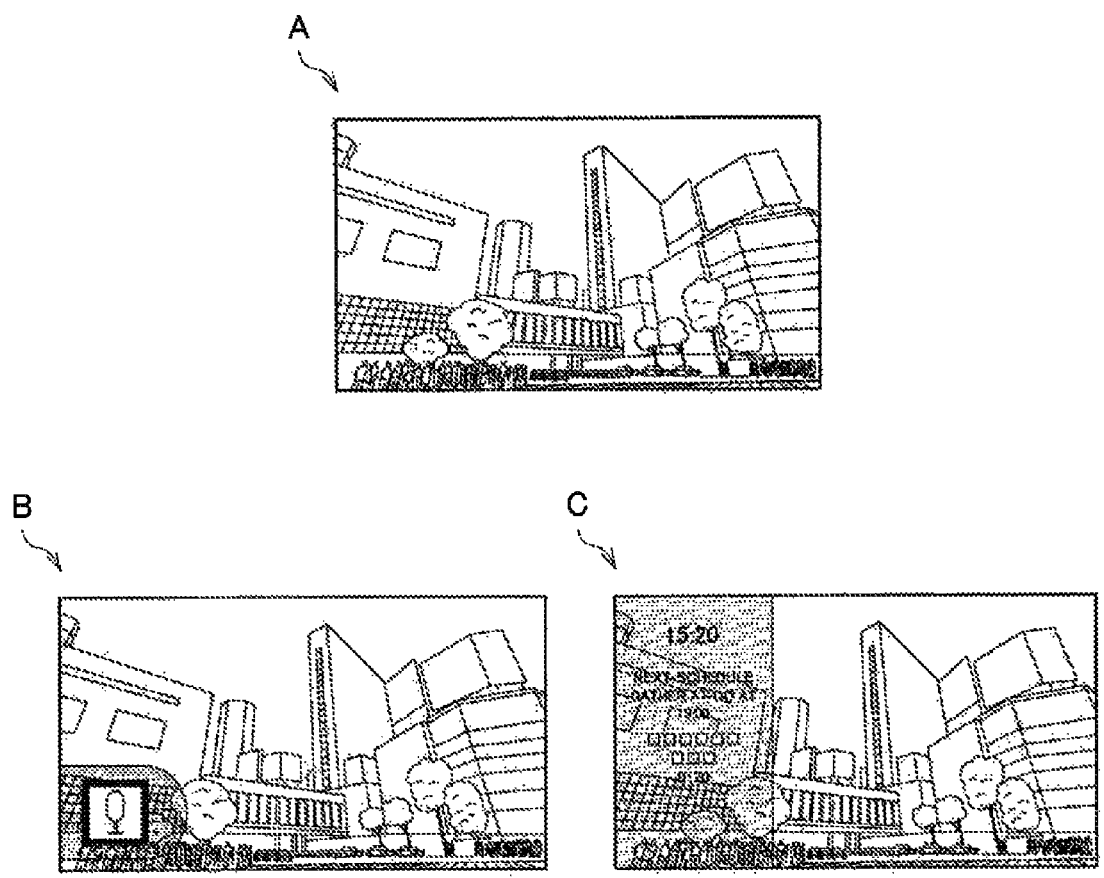
FIG. 2 is an explanatory diagram illustrated to describe an exemplary process of implementing the information processing method according to the present embodiment.

FIG. 2 is an explanatory diagram illustrated to describe an exemplary process of implementing the information processing method according to the present embodiment and illustrates an example of the state in which an application is started. In FIG. 2, an example of the state in which an application is started when the user uses a see-through HMD is illustrated. The portion A in FIG. 2 illustrates an example of an image that is viewed by the user before the application is started. In addition, the portion B in FIG. 2 illustrates an example of the state in which the voice recognition application is started. In addition, the portion C in FIG. 2 illustrates an example of the state in which the application for displaying a notification list is started.

When the voice recognition application is started, a voice recognition icon is displayed, for example as shown in the portion B of FIG. 2. For example, the position at which the voice recognition icon is displayed may coincide with or be different from the position as a trigger to start the application.

Furthermore, when the application for displaying a notification list is started, the notification list is displayed, for example as shown in the portion C of FIG. 2. For example, the position at which the notification list is displayed may coincide with or be different from the position as a trigger to start the application.

It should be understood that examples of the state in which the application is started are not limited to the examples shown in the portions B and C of FIG. 2.

Furthermore, the information processing device according to the present embodiment, when starting the application, for example, may perform display using animation.

Examples of the display using animation in the case when the application is started include sliding in from the position as a trigger to start the application or from the direction corresponding to the position as a trigger to start the application. As described above, even if the user turns the gaze to other parts in a moment, by sliding in from the position as a trigger to start the application or the like, it is possible to allow the user to be reminded. Thus, as described above, the slide-in from the position as a trigger to start the application assists the user in understanding the behavior of the system. It should be understood that the display using animation in the case when the application is started is not limited to the examples described above.

The description of the first example of the process of implementing the information processing method according to the present embodiment will be continued by referring back to FIG. 1. If it is determined in step S102 that the application is started, the information processing device according to the present embodiment determines whether the position as a trigger to terminate the application is watched (S110).

Examples of the position as a trigger to terminate the application according to the present embodiment include examples described below. In addition, the position as a trigger to start the application according to the present embodiment in step S104 and the position as a trigger to terminate the application according to the present embodiment in step S110 may be the same or may be different. In this description, the position as a trigger to terminate the application according to the present embodiment corresponds to the second position according to the present embodiment. It should be understood that the position as a trigger to terminate the application according to the present embodiment is not limited to the examples described below.

In the region on the display screen within 5 cm from the right end as viewed from the user who is viewing the display screen In the leftmost region of the display screen as viewed from the user who is viewing the display screen when the display screen is divided into three screens in the horizontal direction In the region that is set for each application, such as in the lower left region of the display screen as viewed from the user who is viewing the display screen for the application related to imaging and in the lower right region of the display screen as viewed from the user who is viewing the display screen for the application related to voice recognition If it is not determined in step S110 that the position as a trigger to terminate the application is watched, the information processing device according to the present embodiment repeats, for example, the processes from step S100.

Furthermore, if it is determined in step S110 that the position as a trigger to terminate the application is watched, the information processing device according to the present embodiment determines, for example, whether a set prescribed time elapses (S112), similarly to step S106. It should be understood that the prescribed time in step S106 and the prescribed time in step S112 may be the same or may be different.

If it is not determined in step S112 that the prescribed time elapses, the information processing device according to the present embodiment repeats, for example, the process from step S110.

Furthermore, if it is determined in step S112 that the prescribed time elapses, the information processing device according to the present embodiment terminates the application (S114). The information processing device according to the present embodiment terminates the application, for example, by generating a termination instruction to terminate the application and by executing the termination instruction or by causing an external device to execute the termination instruction. Then, the information processing device according to the present embodiment repeats the processes from step S100.

When the application that is determined to be started in step S102, for example, is in starting state (e.g. animation is starting), the information processing device according to the present embodiment cancels the starting of the application being in starting state. In other words, the termination of the application according to the present embodiment includes, for example, termination of the application whose starting is completed and cancellation of the starting of the application being in starting state.

In some cases, the timing to terminate may be different depending on the application being in starting state.

For example, in the application for displaying a notification list as shown in the portion C of FIG. 2, when the current state (e.g. time, next schedule, or musical piece being played at present) is displayed, the timing to erase the notification list (to terminate the application for displaying the notification list) may be necessary.

When the application to be terminated is necessary to have a timing to terminate it, the information processing device according to the present embodiment terminates the application by performing, for example, the processes of step S110 to S114 shown in FIG. 1.

On the other hand, in the voice recognition application as shown in the portion B of FIG. 2, it is possible to hide an icon at the same time as when the voice recognition is terminated, for example, by initiating the voice recognition immediately after the application is started and by setting a pause of the voice to a voice recognition termination timing. Thus, for example, like the voice recognition application described above, when the application to be terminated is not an application that is necessary to have a timing to terminate it, the information processing device according to the present embodiment does not perform the termination of the application, for example, by the processes of steps S110 to S114 shown in FIG. 1.

Furthermore, the information processing device according to the present embodiment, when terminating the application, for example, may perform display using animation.

Examples of the display using animation in the case when the application is terminated include sliding out to the position as a trigger to terminate the application or from the direction corresponding to the position as a trigger to terminate the application. As described above, even if the user turns the gaze to other parts in a moment, by sliding out to the position as a trigger to terminate the application or the like, it is possible to allow the user to be reminded. Thus, as described above, the slide-out to the position as a trigger to terminate the application assists the user in understanding the behavior of the system. It should be understood that the display using animation in the case when the application is terminated is not limited to the examples described above.

The information processing device according to the present embodiment performs, for example, the process shown in FIG. 1 as the process of implementing the information processing method according to the present embodiment. The process shown in FIG. 1 allows, for example, the information processing device according to the present embodiment to achieve "starting of the application when the user views the predetermined position" and "termination of the application when the user views the predetermined position."

Figure 3:
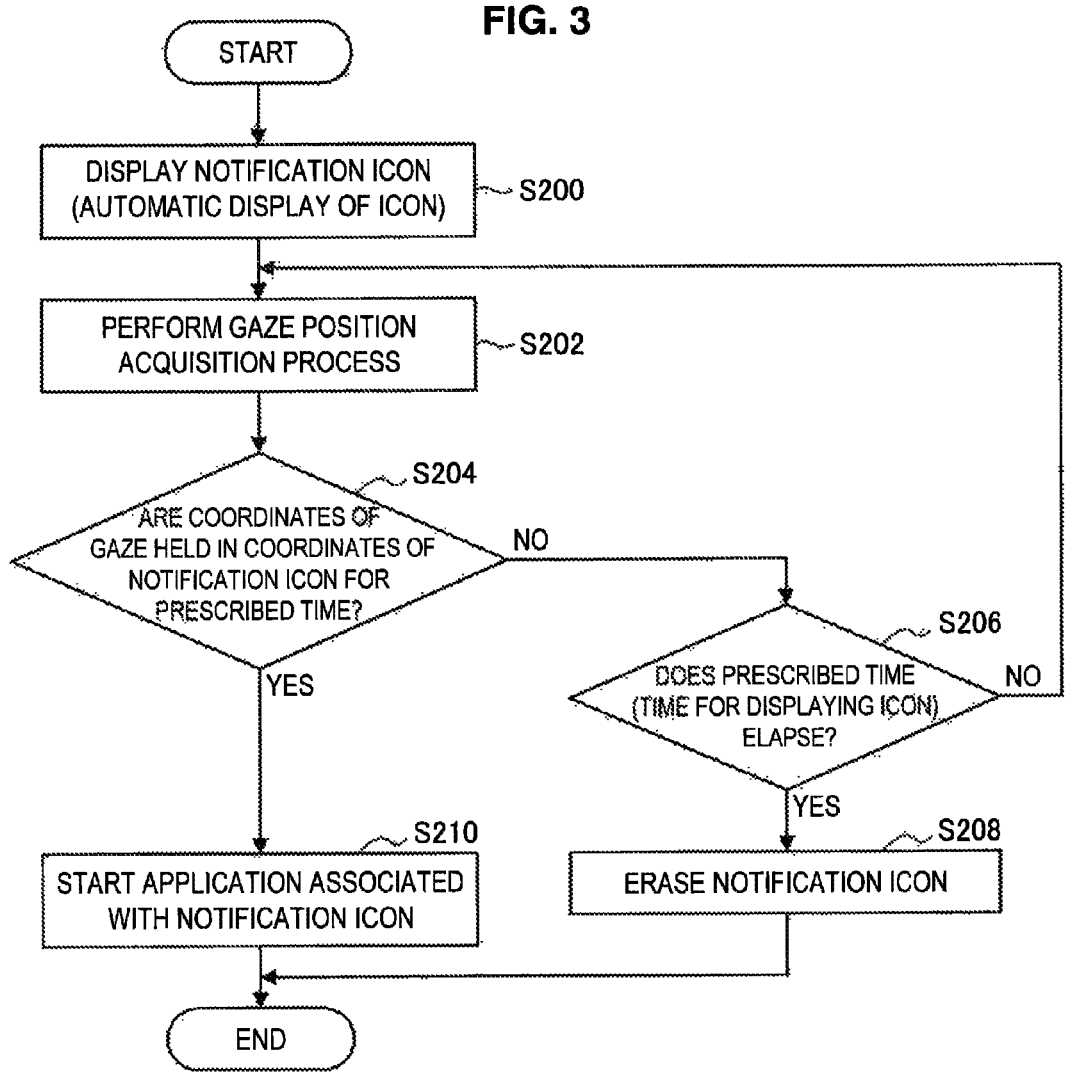
FIG. 3 is a flowchart illustrated to describe a second example of a process of implementing an information processing method according to a present embodiment.

(II) Second example of process of implementing information processing method according to present embodiment FIG. 3 is a flowchart illustrated to describe a second example of the process of implementing the information processing method according to the present embodiment. In this description, the second example of the process of implementing the information processing method according to the present embodiment shown in FIG. 3 corresponds to an example of the process in the case where the information processing device according to the present embodiment performs the process of the above item (1) (gaze position acquisition process), and "the determination process and the state control process according to the first example." FIG. 3 illustrates an example in which the process of implementing the information processing method according to the present embodiment is applied to the case where notification (e.g. incoming of electronic mail, incoming of telephone call, ringing of scheduled alarm), which is displayed automatically even without starting using the user's gaze, is displayed in more detail.

In FIG. 3, for example, a process of step S302 corresponds to the process of the above item (1) (gaze position acquisition process). In addition, in FIG. 3, a process of step S304 corresponds to an example of the process of the above item (2) (determination process), and processes of steps S306 to S310 correspond to an example of the process of the above item (3) (state control process).

The information processing device according to the present embodiment displays, for example, an icon related to notification (hereinafter referred to as "notification icon") when an incoming call (electronic mail, alarm, telephone, or the like) is detected (S300).

Figure 4:
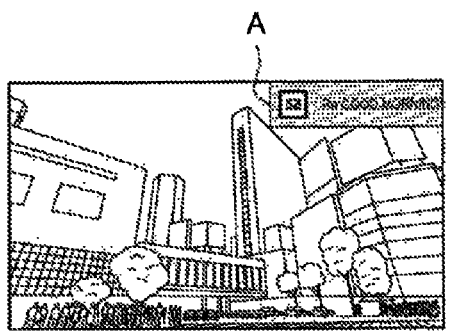
FIG. 4 is an explanatory diagram illustrated to describe an exemplary process of implementing the information processing method according to the present embodiment.

FIG. 4 is an explanatory diagram illustrated to describe an example of the process of implementing the information processing method according to the present embodiment, and illustrates an example of the notification icon according to the present embodiment. The portion A of FIG. 4 illustrates an example of the notification icon. When the notification icon as shown in the portion A of FIG. 4 is displayed, the information processing device according to the present embodiment may use, for example, animation representations such as fade-in.

The description of the second example of the process of implementing the information processing method according to the present embodiment will be continued by referring back to FIG. 3. When the process of step S200 is performed, the information processing device according to the present embodiment performs the gaze position acquisition process (S202). The information processing device according to the present embodiment can perform the process of step S202, for example, regardless of the process of step S200.

The information processing device according to the present embodiment determines whether coordinates of gaze (an example of the gaze position) are held in coordinates of a notification icon (an example of the first position described above) for a prescribed time (S204). In this regard, the process of step S204 corresponds to, for example, the processes of steps S104 and S106 shown in FIG. 1, and the information processing device according to the present embodiment performs, for example, a similar process in step S204 to those of steps S104 and S106 shown in FIG. 1.

If it is not determined in step S204 that coordinates of gaze are held in coordinates of a notification icon for a prescribed time, the information processing device according to the present embodiment determines, for example, whether a prescribed time elapses (S206), similarly to step S106 of FIG. 1.

If it is not determined in step S206 that a prescribed time elapses, the information processing device according to the present embodiment repeats, for example, the processes from step S202.

Furthermore, if it is determined in step S206 that a prescribed time elapses, the information processing device according to the present embodiment erases, for example, the notification icon from a display screen (S208). In this regard, when the notification icon is erased from the display screen, the information processing device according to the present embodiment may use, for example, animation representations such as fade-out.

If it is determined in step S204 that the coordinates of gaze are held in coordinates of a notification icon for a prescribed time, the information processing device according to the present embodiment starts, for example, an application associated with the notification icon (S210).

The information processing device according to the present embodiment performs, for example, the process illustrated in FIG. 3 as the process of implementing the information processing method according to the present embodiment. For example, the process illustrated in FIG. 3 allows the information processing device according to the present embodiment to achieve "starting of the application when the user views the predetermined position."

Figure 5:
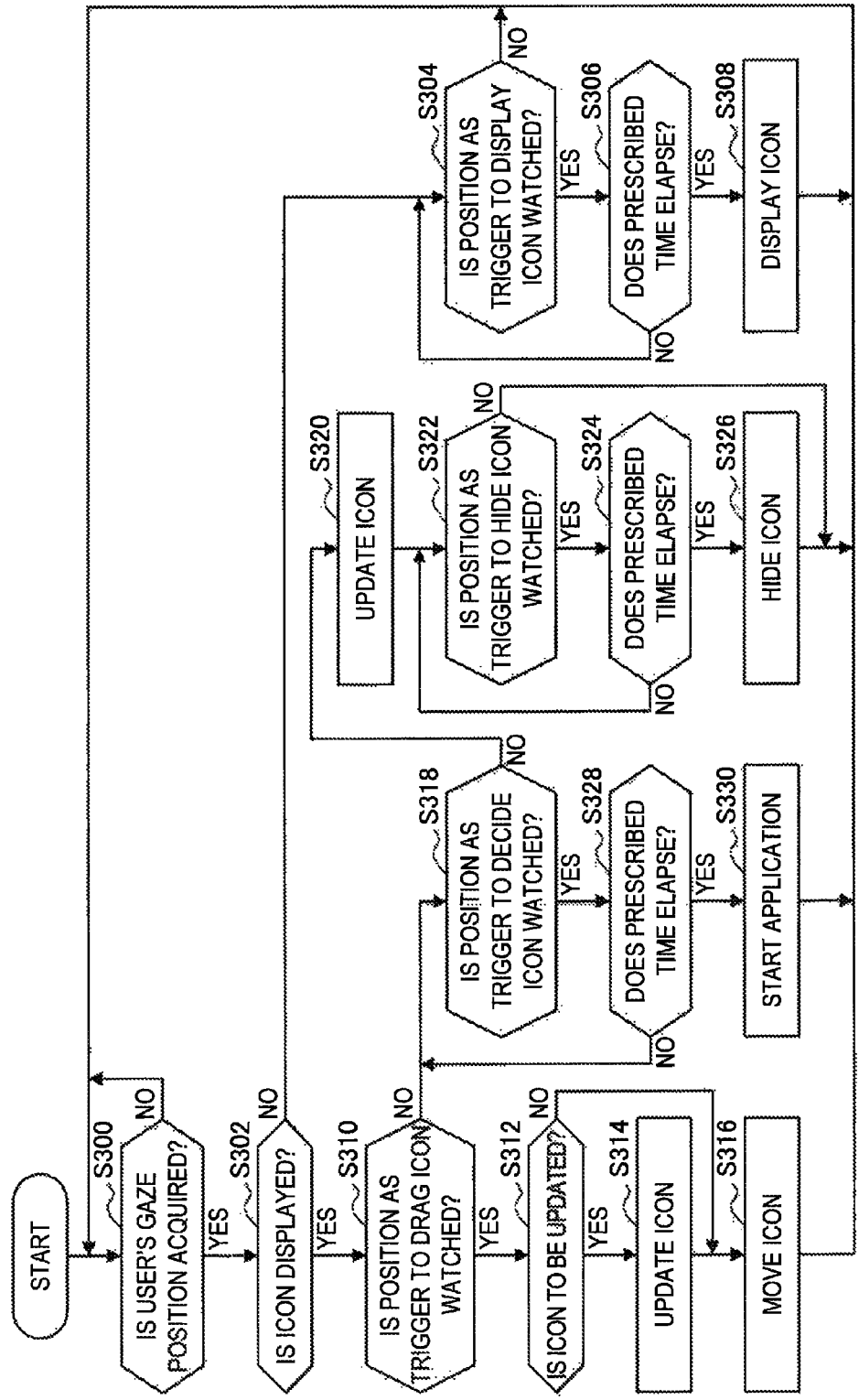
FIG. 5 is a flowchart illustrated to describe a third example of a process of implementing an information processing method according to a present embodiment.

(III) Third example of process of implementing information processing method according to present embodiment FIG. 5 is a flowchart illustrated to describe a third example of the process of implementing the information processing method according to the present embodiment. In this description, the third example of the process of implementing the information processing method according to the present embodiment corresponds to an example of the process in the case where the information processing device according to the present embodiment performs the process of the above item (1) (gaze position acquisition process), and "the determination process and the state control process according to the eighth example". In FIG. 5, for example, processes of steps S200 to S206, S210, S212, S218, S222, S224, and S228 correspond to an example of the process of the above item (2) (determination process). In addition, in FIG. 5, processes of steps S208, S214, S216, S220, S226, and S230 correspond to an example of the process of the above item (3) (state control process). In FIG. 5, although the process of the above item (1) (gaze position acquisition process) is omitted, the process of the above item (1) (gaze position acquisition process) is performed, for example, constantly, or at regular or irregular intervals.

The information processing device according to the present embodiment determines whether the user's gaze position is acquired (S300). The user's gaze position is acquired, for example, through the process of the above item (1) (gaze position acquisition process).

If it is not determined in step S300 that the gaze position is acquired, the information processing device according to the present embodiment does not proceed to the next step until it is determined that the gaze position is acquired.

Furthermore, if it is determined in step S300 that the gaze position is acquired, the information processing device according to the present embodiment determines whether an icon (an example of a display object, and this is similarly applied to the following description) is displayed (S302).

If it is not determined in step S302 that the icon is displayed, the information processing device according to the present embodiment determines whether a position as a trigger to display the icon is watched (S304).

Examples of the position as a trigger to display the icon according to the present embodiment include examples described below. In this description, the position as a trigger to display the icon according to the present embodiment corresponds to the third position according to the present embodiment. It should be understood that the position as a trigger to display the icon according to the present embodiment is not limited to the examples described below.

- In the region on the display screen within 5 cm from the left end as viewed from the user who is viewing the display screen
- In the rightmost region of the display screen as viewed from the user who is viewing the display screen when the display screen is divided into three screens in the horizontal direction If it is not determined in step S304 that the position as a trigger to display the icon is watched, the information processing device according to the present embodiment repeats, for example, the processes from step S300.

Furthermore, if it is determined in step S304 that the position as a trigger to display the icon is watched, the information processing device according to the present embodiment determines, for example, whether a set prescribed time elapses (S306), similarly to step S106 in FIG. 1.

If is not determined in step S306 that the prescribed time elapses, the information processing device according to the present embodiment repeats, for example, the processes from step S304.

Furthermore, if it is determined in step S306 that the prescribed time elapses, the information processing device according to the present embodiment displays an icon corresponding to the position as a trigger to display the icon (S308). The information processing device according to the present embodiment displays the icon, for example, by generating a display instruction to display the icon and by executing the display instruction or causing an external device to execute the display instruction. Then, the information processing device according to the present embodiment repeats the processes from step S300.

In this regard, examples of the icon displayed by the information processing device according to the present embodiment include a menu icon, an application icon, or the like.

Moreover, the information processing device according to the present embodiment displays the icon in step S308, for example, using a method of sliding in the icon from the direction of the position as a trigger to display the icon. It should be understood that the method of displaying the icon corresponding to the position as a trigger to display the icon is not limited to the example described above.

FIG. 6 is an explanatory diagram illustrated to describe an example of the process of implementing the information processing method according to the present embodiment, and illustrates an example of an icon displayed by the information processing device according to the present embodiment. In FIG. 6, an example of an icon displayed by the information processing device according to the present embodiment when the user uses a see-through HMD is illustrated. The portion A in FIG. 6 illustrates an example of an image viewed by the user before the icon is displayed. In addition, the portion B in FIG. 6 illustrates an example of the state displayed after the icon is displayed. It should be understood that an icon displayed by the information processing device according to the present embodiment in step S308 is not limited to the example shown in FIG. 6.

The description of the third example of the process of implementing the information processing method according to the present embodiment will be continued by referring back to FIG. 5. If it is determined in step S302 that the icon is displayed, the information processing device according to the present embodiment determines whether the position as a trigger to drag the icon is watched (S310).

In this regard, the position as a trigger to drag the icon according to the present embodiment corresponds to the fifth position according to the present embodiment.

Figure 7:
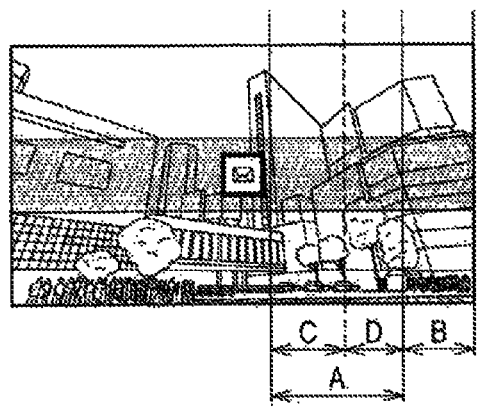
FIG. 7 is an explanatory diagram illustrated to describe an exemplary process of implementing the information processing method according to the present embodiment.

FIG. 7 is an explanatory diagram illustrated to describe an example of the process of implementing the information processing method according to the present embodiment, and illustrates an example of various positions according to the present embodiment. Each of the portions A, B, C, and D shown in FIG. 7 may be an example of various positions according to the present embodiment. In the following, an example of various positions according to the present embodiment will be described with reference to example shown in FIG. 8 as appropriate.

Examples of the position as a trigger to drag the icon according to the present embodiment include the region shown in the portion A of FIG. 7. It should be understood that the position as a trigger to drag the icon according to the present embodiment is not limited to the region shown in the portion A of FIG. 7. In the following, for simplicity of description, the description will be given by taking as an example the case where the position as a trigger to drag the icon according to the present embodiment is the region shown in the portion A of FIG. 7. In addition, the position as a trigger to drag the icon according to the present embodiment may include, for example, a section that updates an icon, a section that does not update an icon, and a section that stops the movement of an icon.

If it is determined in step S310 that the position as a trigger to drag the icon is watched, the information processing device according to the present embodiment determines whether the icon is to be updated (S312).

For example, when the position as a trigger to drag the icon according to the present embodiment is the region shown in the portion A of FIG. 7, the information processing device according to the present embodiment performs the determination in step S312 depending on whether the gaze position is located in the region shown in the portion C of FIG. 7 or is located in the region shown in the portion D of FIG. 7, which are obtained by dividing the region shown in the portion A of FIG. 7 into the two regions. More specifically, the information processing device according to the present embodiment determines that the icon is to be updated, for example, when the gaze position is located in the portion C of FIG. 7. In addition, the information processing device according to the present embodiment does not determine that the icon is to be updated, for example, when the gaze position is located in the portion D of FIG. 7.

The information processing device according to the present embodiment achieves those described below, for example, by determining whether the icon is to be updated, for example, based on whether the gaze position is located in the region shown in the portion C of FIG. 7 or is located in the region shown in the portion D of FIG. 7.

Continuous viewing of the region shown in the portion C of FIG. 7 allows the user to wait until the icon is updated to a desired one while the user drags the icon slightly.

Awareness of the movement of the gaze to the region shown in the portion C of FIG. 7 after the gaze position is located in the region shown in the portion D of FIG. 7 allows the user to change the icon by moving the gaze to the region in the portion C of FIG. 7.

If it is not determined in step S312 that the icon is to be updated, the information processing device according to the present embodiment performs a process of step S316 described later.

Furthermore, if it is determined in step S312 that the icon is to be updated, the information processing device according to the present embodiment updates the icon (S314). The information processing device according to the present embodiment continues to update the icon at every prescribed time when the gaze position is present in the region shown in the portion C of FIG. 7.

The information processing device according to the present embodiment moves the icon (S316). The information processing device according to the present embodiment moves the icon, for example, by generating a movement instruction to move the icon and by executing the movement instruction or by causing an external device to execute the movement instruction. Then, the information processing device according to the present embodiment repeats the processes from step S300.

In this regard, the information processing device according to the present embodiment moves the icon in step S316 so that the icon may be dragged depending on the gaze position.

More specifically, the information processing device according to the present embodiment drags the icon to the right in the display screen as viewed from the user who is viewing the display screen, for example, so that the icon may be dragged to the gaze position depending on the distance from the central position of the display screen to the gaze position. In the following description, the example of the movement of the icon as described above is simply referred to as "drag the icon."

Furthermore, the information processing device according to the present embodiment moves the icon to the position before the movement (e.g. the central position of the display screen as shown in the portion B of FIG. 6), for example, when the gaze position is located in other positions than the region shown in the portion A of FIG. 7. In this case, the information processing device according to the present embodiment may display the icon, for example, using animation.

It should be understood that the method of moving the icon according to the present embodiment is not limited to the example described above.

If it is not determined in step S310 that the position as a trigger to drag the icon is watched, the information processing device according to the present embodiment determines whether the position as a trigger to decide the icon is watched (S318).

In this regard, the position as a trigger to decide the icon according to the present embodiment corresponds to the fourth position according to the present embodiment.

Examples of the position as a trigger to decide the icon according to the present embodiment include a region shown in the portion B of FIG. 7. It should be understood that the position as a trigger to decide the icon according to the present embodiment is not limited to the region shown in the portion B of FIG. 7. In the following, the description will be made taking as an example the case where the position as a trigger to decide the icon according to the present embodiment is the region shown in the portion B of FIG. 7.

Figure 8:
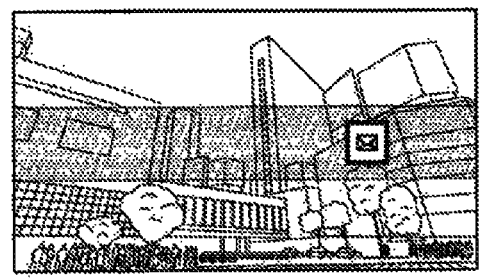
FIG. 8 is an explanatory diagram illustrated to describe an exemplary process of implementing the information processing method according to the present embodiment.

FIG. 8 is an explanatory diagram illustrated to describe an example of the process of implementing the information processing method according to the present embodiment, and illustrates an example of the position at which the icon is displayed in the case when it is determined in step S318 that the position as a trigger to decide the icon is watched.

For example, when the user's gaze position is contained in the region shown in the portion B of FIG. 7, the information processing device according to the present embodiment moves the icon to the position as shown in FIG. 8 (e.g., the position whose central position is located at the boundary between the region A and the region B of FIG. 7. It should be understood that the position at which the icon is displayed in the case when it is determined that the position as a trigger to decide the icon is watched is not limited to the example shown in FIG. 8.

The description of the third example of the process of implementing the information processing method according to the present embodiment will be continued by referring back to FIG. 5. If it is not determined in step S318 that the position as a trigger to decide the icon is watched, the information processing device according to the present embodiment updates the icon (S320).

Figure 9:
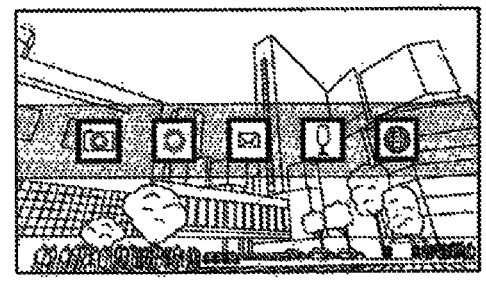
FIG. 9 is an explanatory diagram illustrated to describe an exemplary process of implementing the information processing method according to the present embodiment.
Figure 10:
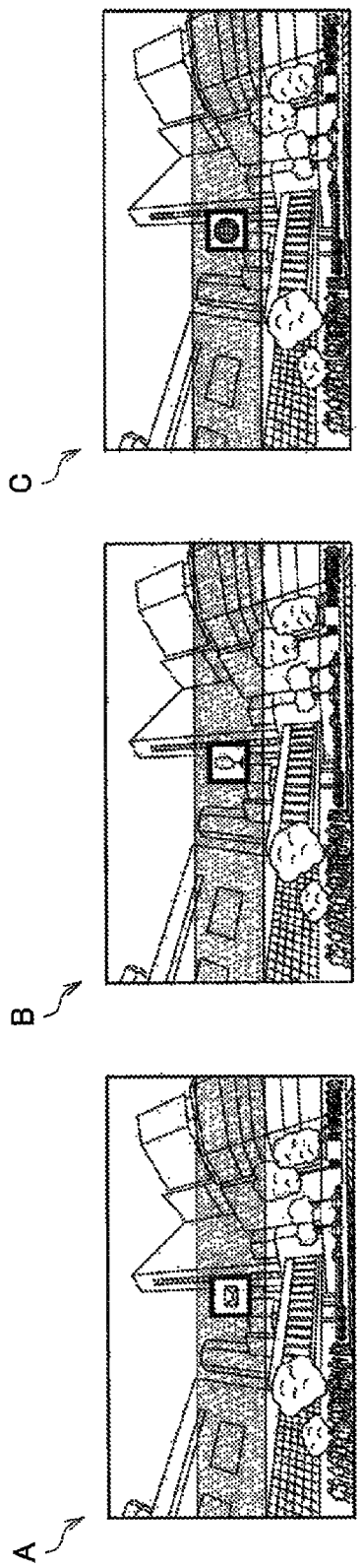
FIG. 10 is an explanatory diagram illustrated to describe an exemplary process of implementing the information processing method according to the present embodiment.

FIGS. 9 and 10 are explanatory diagrams illustrated to describe an example of the process of implementing the information processing method according to the present embodiment. FIG. 9 illustrates an example of the case where a plurality of icons are displayed side by side on a display screen, and FIG. 10 illustrates an example of the case where a plurality of icons are updated and displayed one by one. FIG. 10 illustrates an example in which the display state of the display screen is updated in the order of the portions A, B, and C of FIG. 10.

In the case where the user desires to perform an operation only using the gaze, for example, when a plurality of icons are displayed on the display screen side by side as shown in FIG. 9, it is necessary for the user to align the gaze with a desired icon to select the desired icon, which leads to a burden to the user. In addition, when the burden is placed on the user, there is a risk that the convenience and usability of the user may be impaired.

Thus, the information processing device according to the present embodiment displays a plurality of icons one by one while being updated, for example as shown in FIG. 10. The information processing device according to the present embodiment updates the displayed icon, for example, at every set prescribed time. It should be understood that when a plurality of icons are displayed one by one while being updated, the order in which icons are displayed is not limited to the example shown in FIG. 10.

The description of the third example of the process of implementing the information processing method according to the present embodiment will be continued by referring back to FIG. 5. The information processing device according to the present embodiment determines whether the position as a trigger to hide the icon is watched (S322).

Examples of the position as a trigger to hide the icon according to the present embodiment include examples described below. In this description, the position as a trigger to hide the icon according to the present embodiment corresponds to the sixth position according to the present embodiment.

In the region on the display screen within 5 cm from the right end as viewed from the user who is viewing the display screen In the leftmost region of the display screen as viewed from the user who is viewing the display screen when the display screen is divided into three screens in the horizontal direction The position as a trigger to hide the icon according to the present embodiment is not limited to the examples described above. For example, examples of the position as a trigger to hide the icon according to the present embodiment include any position that is different from the position as a trigger to decide the icon or the position as a trigger to drag the icon. In addition, the position as a trigger to hide the icon according to the present embodiment may be the same position, for example, as the position as a trigger to display the icon.

If it is not determined in step S322 that the position as a trigger to hide the icon is watched, the information processing device according to the present embodiment repeats, for example, the processes from step S300.

Furthermore, if it is determined in step S322 that the position as a trigger to hide the icon is watched, the information processing device according to the present embodiment determines, for example, whether a set prescribed time elapses (S324), similarly to step S306. In this regard, the prescribed time in step S306 and the prescribed time in step S324 may be the same or may be different.

If it is not determined in step S324 that the prescribed time elapses, the information processing device according to the present embodiment repeats, for example, the processes from step S322.

Furthermore, if it is determined in step S324 that the prescribed time elapses, the information processing device according to the present embodiment hides the icon (S326). The information processing device according to the present embodiment hides the icon, for example, by generating a hiding instruction to hide the icon and by executing the hiding instruction or by causing an external device to execute the hiding instruction. Then, the information processing device according to the present embodiment repeats the processes from step S300. In this regard, examples of the method of hiding the icon according to the present embodiment include sliding out the icon to be hidden in the direction of the position as a trigger to hide the icon.

If it is determined in step S318 that the position as a trigger to decide the icon is watched, the information processing device according to the present embodiment determines, for example, whether a set prescribed time elapses (S328), similarly to step S306. In this regard, the prescribed time in step S328 may be the same as or different from the prescribed time in step S306 and/or the prescribed time in step S324.

If it is not determined in step S328 that the prescribed time elapses, the information processing device according to the present embodiment repeats, for example, the processes from step S318.

If it is determined in step S328 that the prescribed time elapses, the information processing device according to the present embodiment starts the application (S330). Then, the information processing device according to the present embodiment repeats the processes from step S300.

In this regard, in step S308, the information processing device according to the present embodiment starts the application that is associated with the displayed icon. In addition, the information processing device according to the present embodiment starts the application, for example, by generating a start instruction to start the application and by executing the start instruction or causing an external device to execute the start instruction.

The information processing device according to the present embodiment performs, for example, the process shown in FIG. 5 as the process of implementing the information processing method according to the present embodiment. For example, the process shown in FIG. 5 allows the information processing device according to the present embodiment to achieve those described below.

Viewing of the position being set by the user allows an icon associated with the application to be displayed Continuous viewing of the icon by the user allows the icon to be switched to another icon associated with another application Viewing the icon by the user in a different direction from the initial viewing direction allows the icon currently displayed to be moved to a position in the other direction Viewing of the position being set by the user allows the application associated with the icon to be started Supplement of third example of process of implementing information processing method The third example of the process of implementing the information processing method according to the present embodiment shown in FIG. 5 described above will be additionally described.

(A) Layout of icon

Figure 11:
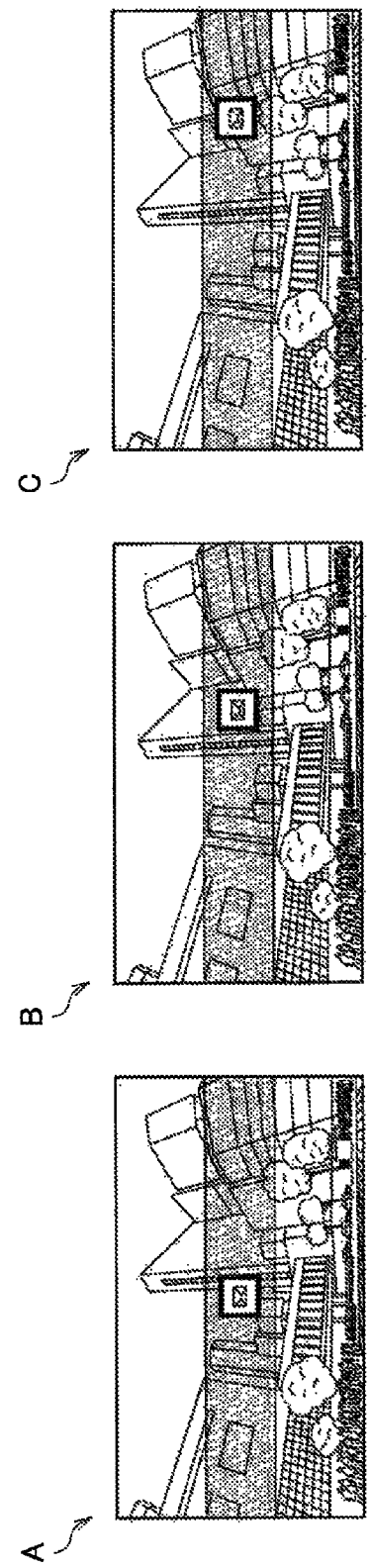
FIG. 11 is an explanatory diagram illustrated to describe an exemplary process of implementing the information processing method according to the present embodiment.
Figure 12:
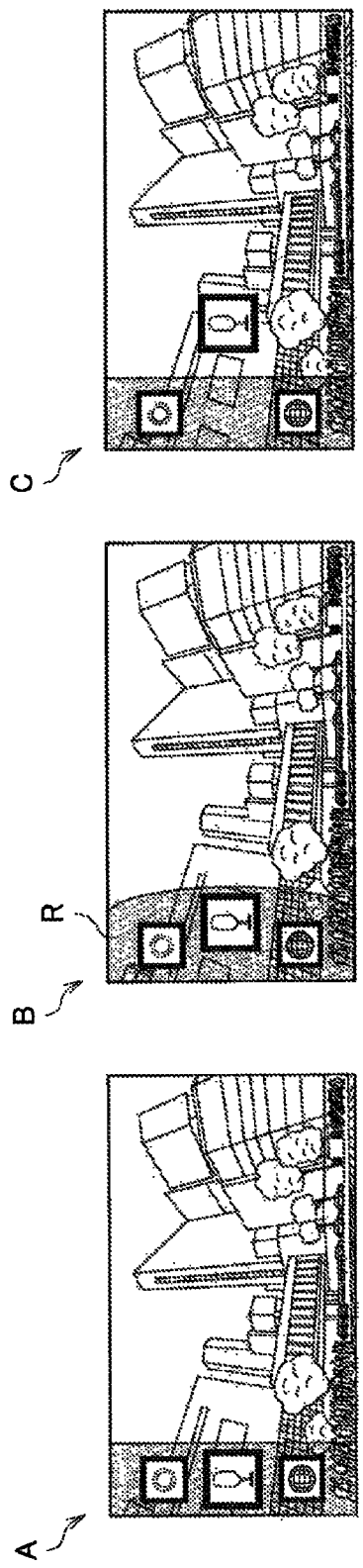
FIG. 12 is an explanatory diagram illustrated to describe an exemplary process of implementing the information processing method according to the present embodiment.

FIGS. 11 and 12 are explanatory diagrams illustrated to describe an example of the process of implementing the information processing method according to the present embodiment, and illustrate an example of layout of icons in the third example of the process of implementing the information processing method according to the present embodiment shown in FIG. 5. The portion A of FIG. 11 and the portion A of FIG. 12 each illustrates an example of the display state in the case when an icon is displayed. In addition, the portion B of FIG. 11 and the portion B of FIG. 12 each illustrates an example of the display state in the case when an icon is dragged. In addition, the portion C of FIG. 11 and the portion C of FIG. 12 each illustrates an example of the display state in the case when an icon is decided.

For example, when the layout shown in FIG. 11 is employed, one icon is displayed on the display screen, and the displayed icon is updated, for example, through the process of step S314 in FIG. 5 or the like.

Furthermore, for example, when the layout shown in FIG. 12 is employed, a plurality of icons are displayed, and FIG. 12 illustrates an example in which three icons are displayed in the vertical direction on the display screen.

For example, in FIG. 12, an icon in the center of three icons is displayed larger than other icons, and the icon displayed in the center moves so that it may be dragged depending on the user's gaze position. In this case, the information processing device according to the present embodiment may use animation so that the region R in which an icon is placed may be moved together with the movement of the icon, for example as shown in the portion B of FIG. 12. Then, an application corresponding to the icon displayed in the center is activated depending on the gaze position.

Figure 13:
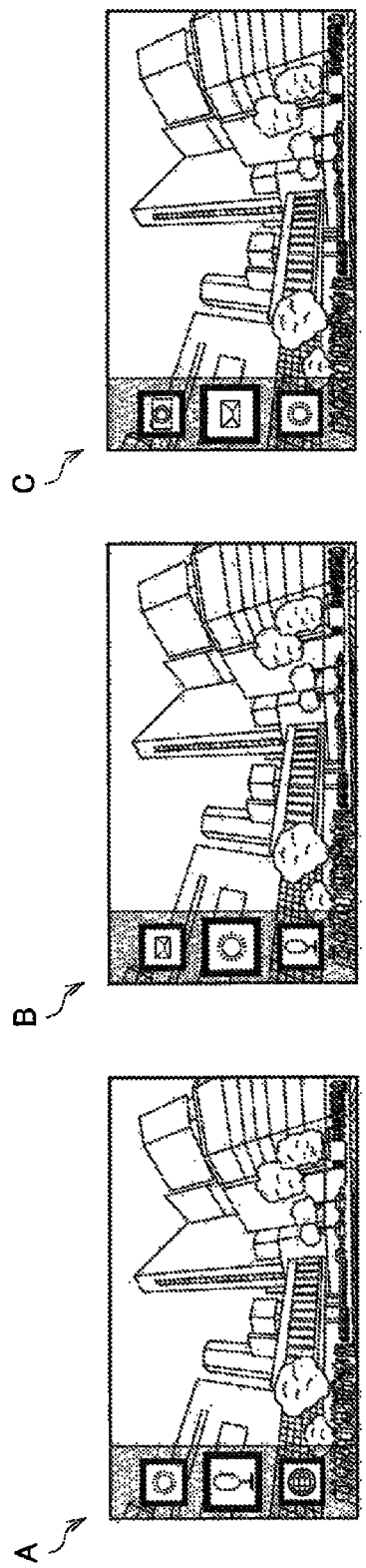
FIG. 13 is an explanatory diagram illustrated to describe an exemplary process of implementing the information processing method according to the present embodiment.

For example, the icon displayed when the layout shown in FIG. 12 is employed is not limited to the example shown in FIG. 12. FIG. 13 is an explanatory diagram illustrated to describe an example of the process of implementing the information processing method according to the present embodiment, and illustrates another example of the display state in the case when the layout shown in FIG. 12 is employed.

For example as shown in the portion A of FIG. 13, the portion B of FIG. 13, and the portion C of FIG. 13, it is also possible for the information processing device according to the present embodiment to update the application that can be selected by the user (application to be started) by scrolling the icon from the top to the bottom of the display screen as viewed from the user who views the display screen. In addition, for example as shown in the portion C of FIG. 13, the portion B of FIG. 13, and the portion A of FIG. 13, the information processing device according to the present embodiment may update the application that can be selected by the user (application to be started) by scrolling the icon from the bottom to the top of the display screen as viewed from the user who views the display screen.

In this regard, the information processing device according to the present embodiment performs the scrolling display of the icon as shown in FIG. 13, for example, by scrolling the icon at regular or irregular intervals. In addition, the information processing device according to the present embodiment may perform the scrolling display of the icon as shown in FIG. 13, for example, based on the user's gaze position.

(B) Method of displaying icon

The information processing device according to the present embodiment displays an icon at the position as a trigger to display the icon or from the direction corresponding to the position as a trigger to display the icon. For example, taking the example of FIGS. 11 and 12 as an example, when the user views "the inside of the leftmost region of the display screen as viewed from the user who is viewing the display screen when the display screen is divided into three screens in the horizontal direction", the information processing device according to the present embodiment displays the icon from the left side of the display screen as viewed from the user who is viewing the display screen.

The method of displaying an icon according to the present embodiment is not limited to the example described above, and the information processing device according to the present embodiment can also display an icon, for example, at any position or from any direction which is associated with the position as a trigger to display the icon.

(C) Method of deciding icon

Taking the layout shown in FIGS. 11 and 12 as an example, an example of the method of deciding an icon associated with the application to be started will be described.

For example, when the state in which an icon is displayed is the portion A shown in FIG. 11, the icon being displayed is an icon corresponding to the application to be controlled. In addition, for example, when the state in which an icon is displayed is the portion A shown in FIG. 12, the icon displayed in the center of the three icons is an icon corresponding to the application to be controlled.

In the examples shown in FIGS. 11 and 12, the information processing device according to the present embodiment changes the state from the state shown in the portion A of FIG. 11 and the portion A of FIG. 12 to the state shown in the portion B of FIG. 11 and the portion B of FIG. 12, respectively, when the user's gaze position is moved from the position at which an icon is displayed to the right of the display screen as viewed from the user who is viewing the display screen by a predetermined distance or more. In other words, in the examples shown in FIGS. 11 and 12, the displayed icon begins to move following the user's gaze.

Furthermore, when the icon is moved to a predetermined location, the information processing device according to the present embodiment stops, for example, the movement of the icon and performs the process of step S328 in FIG. 4. If it is determined that the user views the right of the display screen as viewed from the user who is viewing the display screen during the prescribed time that is related to the process of step S328 in FIG. 4, the information processing device according to the present embodiment moves the icon again to the right of the display screen as viewed from the user who is viewing the display screen, and regards the icon as being decided. Then, the information processing device according to the present embodiment starts the application associated with the icon.

Moreover, the information processing device according to the present embodiment divides, for example, the section from beginning to move the icon following the user's gaze to the completion of the movement into a region where updating of the icon is continued and a region where updating of the icon is discontinued. As described above, the division of the section from beginning to move the icon following the user's gaze to the completion of the movement allows erroneous decision of an icon different from the user's desired icon to be prevented.

(D) Method of updating icon

The information processing device according to the present embodiment updates an icon, for example, using methods described below. It should be understood that the methods of updating an icon according to the present embodiment are not limited to examples described below.

Method of switching automatically an icon at prescribed time intervals

Method of switching an icon by allowing the user to move the gaze on the display screen in the vertical direction as viewed from the user who is viewing the display screen Method of switching an icon by allowing the user to move the gaze to a position (or direction) opposite to the position as a trigger to decide the icon (a) Method of switching automatically an icon at prescribed time intervals The information processing device according to the present embodiment updates, for example, an icon at prescribed time intervals that is set after the icon is displayed. In this regard, the prescribed time intervals according to the present embodiment may be a predetermined fixed time interval or may be a time interval that can be changed based on the user's operation.

More specifically, for example, when the layout shown in FIG. 11 is employed, the information processing device according to the present embodiment switches a displayed icon to another icon instantaneously.

Figure 14:
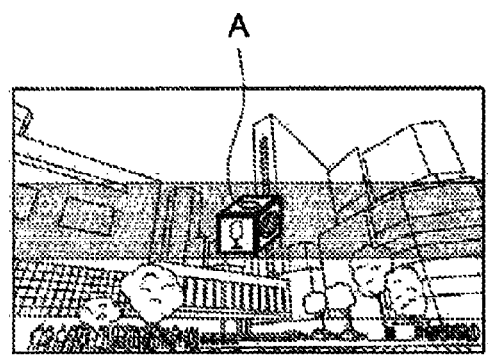
FIG. 14 is an explanatory diagram illustrated to describe an exemplary process of implementing the information processing method according to the present embodiment.

The display method related to switching of an icon in the case when the layout shown in FIG. 11 is employed is not limited to the above. FIG. 14 is an explanatory diagram illustrated to describe an example of the process of implementing the information processing method according to the present embodiment, and illustrates another example of the display method related to switching of an icon in the case when the layout shown in FIG. 11 is employed.

For example, the information processing device according to the present embodiment may switch the icon so that a cube in which a plurality of icons are arranged in each face rotates about one axis (e.g. Y-axis) at the central position or the like of the display screen as shown in the portion A of FIG. 14.

For example, in the example shown in FIG. 14, the information processing device according to the present embodiment stops the rotation of the cube for a prescribed time (e.g. 1 sec.) at every rotation of the cube by 90°. For example, when the cube stops its rotation, the icon is moved so that it is dragged by allowing the user to turn the gaze from the above the icon to the position as a trigger to decide the icon (or direction corresponding to the position as a trigger to decide the icon).

Furthermore, for example, when the layout shown in FIG. 12 is employed, the information processing device according to the present embodiment scrolls the icon from the top to the bottom (or, from the bottom to the top) of the display screen as viewed from the user who is viewing the display screen, for example, at prescribed time intervals. In this case, examples of the scrolling display include display using animation representations such as "scrolling from the state shown in the portion A of FIG. 13 to the state shown in the portion B of FIG. 13 at 0.5 sec., stopping in the state shown in the portion B of FIG. 13 for 1 sec., and scrolling from the state shown in the portion B of FIG. 13 to the state shown in the portion C of FIG. 13 at 0.5 sec.".

For example, when the stop period as described above is set, the icon is moved so that it is dragged by allowing the user to move the gaze from the above the icon to the position as a trigger to decide the icon (or direction corresponding to the position as a trigger to decide the icon) during the icon is stopped.

The scrolling display according to the present embodiment is not limited to the above. For example, it is also possible for the information processing device according to the present embodiment to scroll the icon smoothly without setting the stop period as described above.

(b) Method of switching an icon by allowing the user to move the gaze on the display screen in the vertical direction as viewed from the user who is viewing the display screen For example, even when any one of the layout shown in FIG. 11 and the layout shown in FIG. 12 is employed, the information processing device according to the present embodiment switches the icon, for example, by using the movement of the user's eyes in the vertical direction as a trigger.

(c) Method of switching an icon by allowing the user to move the gaze to a position (or direction) opposite to the position as a trigger to decide the icon For example, when the layout shown in FIG. 11 is employed, the information processing device according to the present embodiment switches the icon, for example, in the case when the gaze position is located at a position or a region in the direction, which is opposite to the position as a trigger to decide the icon.

(E) Timing to hide icon

The information processing device according to the present embodiment hides the icon in the case when the user views the position as a trigger to hide the icon for a prescribed time, for example as shown in steps S322 to S326 of FIG. 4. The information processing device according to the present embodiment hides the icon, for example, by displaying the icon to be hidden using animation and at the same time by sliding out the icon in the direction viewed by the user. In addition, it is also possible for the information processing device according to the present embodiment to hide the icon to be hidden instantaneously.

Furthermore, when the icon is hidden using the animation representations as described above, for example, the information processing device according to the present embodiment hides a belt-like object on which the icon is placed as shown in FIG. 11 or 12 or hides another icon that is not selected depending on the gaze position shown in FIG. 12.

Information processing device according to present embodiment

The description will be made as to an exemplary configuration of the information processing device according to the present embodiment that is capable of performing the process of implementing the information processing method according to the present embodiment described above.

Figure 15:
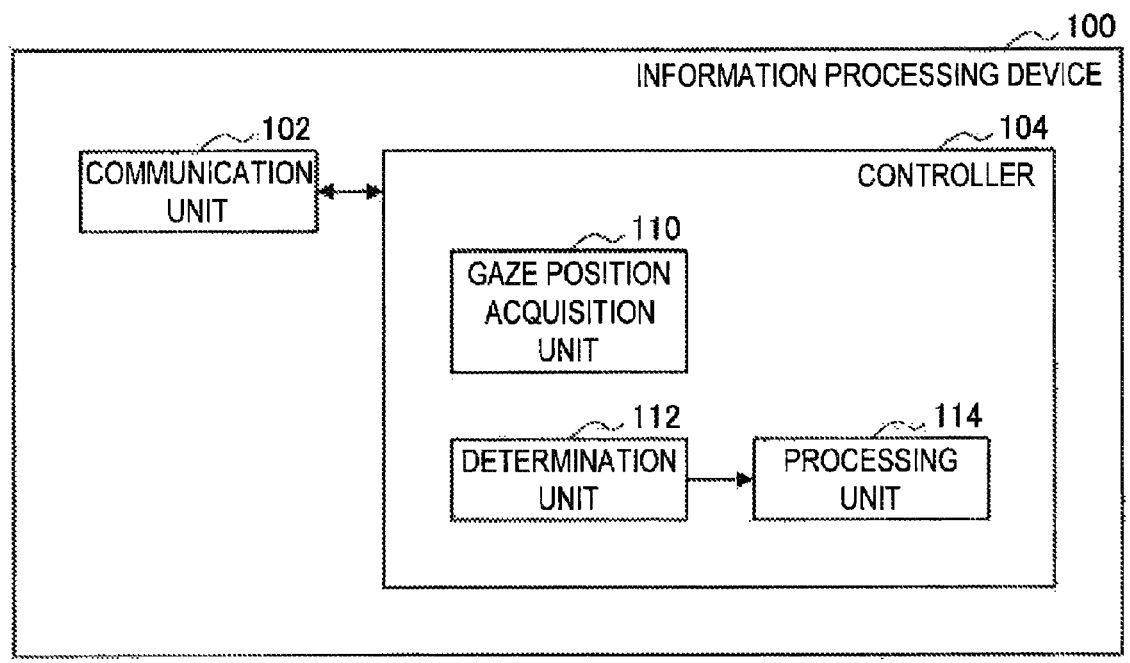
FIG. 15 is a block diagram illustrating an exemplary configuration of an information processing device according to the present embodiment.

FIG. 15 is a block diagram illustrating an exemplary configuration of the information processing device 100 according to the present embodiment. The information processing device 100 is configured to include, for example, a communication unit 102 and a controller 104.

Furthermore, the information processing device 100 may be configured to include, for example, a read-only memory (ROM, not shown), a random access memory (RAM, not shown), a storage unit (not shown), an operation unit that is operable by the user (not shown), a display unit that displays various pictures on a display screen (not shown), or the like. In the information processing device 100, the components described above are connected to each other via a bus that functions as a data transmission line.

The ROM (not shown) stores data for control, such as programs and operation parameters that are used by the controller 104. The RAM (not shown) stores temporarily programs or the like that are executed by the controller 104.

The storage unit (not shown) is a storage means provided in the information processing device 100, and stores various data, for example, including data related to the information processing method according to the present embodiment such as information relating to the user's gaze position, data related to the display of a display object or the like, and applications. Examples of the storage unit (not shown) include a magnetic recording medium such as hard disk and nonvolatile memory such as flash memory. The storage unit (not shown) may be removable from the information processing device 100.

Examples of the operation unit (not shown) include an operation input device described later. In addition, examples of the display unit (not shown) include a display device described later.

Exemplary hardware configuration of information processing device 100

Figure 16:
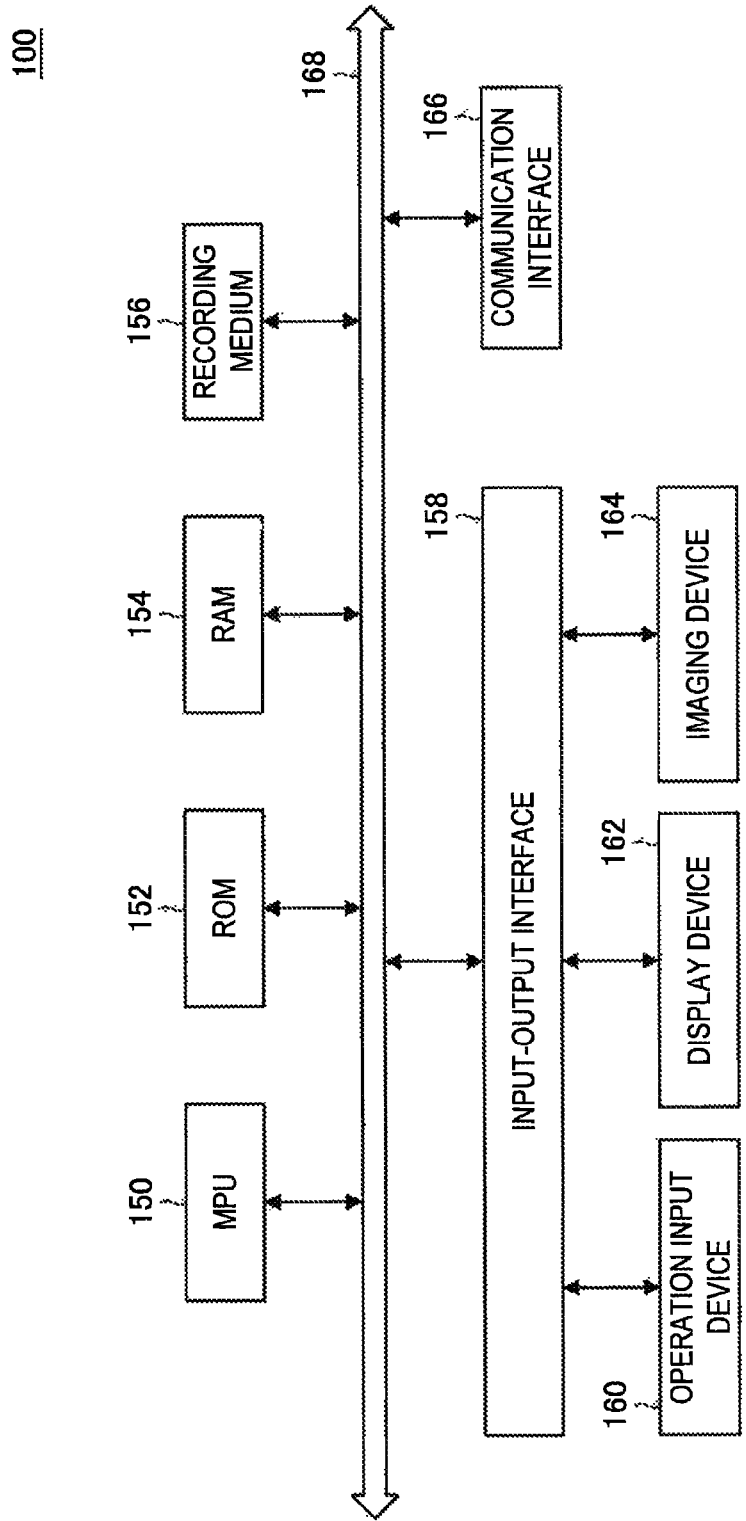
FIG. 16 is a diagram illustrated to describe an exemplary hardware configuration of the information processing device according to the present embodiment.

FIG. 16 is a diagram illustrated to describe an exemplary hardware configuration of the information processing device 100 according to the present embodiment. The information processing device 100 is configured to include, for example, an MPU 150, a ROM 152, a RAM 154, a recording medium 156, an input-output interface 158, an operation input device 160, a display device 162, an imaging device 164, and a communication interface 166. In addition, in the information processing device 100, the components are connected to each other via a bus 168 that functions as a data transmission line.

The MPU 150 is configured to include, for example, a processor composed of an arithmetic logic circuit or the like such as micro processing unit (MPU) and various processing circuits, and functions as the controller 104 that controls the entire information processing device 100. In addition, the MPU 150 serves as, for example, a gaze position acquisition unit 110, a determination unit 112, and a processing unit 114, which will be described later.

The ROM 152 stores data for control, such as programs and operation parameters used by the MPU 150. The RAM 154 stores temporarily programs or the like executed by the MPU 150.

The recording medium 156 functions as the storage unit (not shown), and stores data related to the information processing method according to the present embodiment such as information relating to the user's gaze position, data related to display of a display object or the like, and applications. In this regard, examples of the recording medium 156 include a magnetic recording medium such as hard disk and nonvolatile memory such as flash memory. In addition, the recording medium 156 may be removable from the information processing device 100.

The input-output interface 158 is used for connection of the operation input device 160, the display device 162, and the imaging device 164. The operation input device 160 functions as an operation unit (not shown), and the display device 162 functions as a display unit (not shown). In addition, the imaging device 164 functions as an imaging unit (not shown). In this regard, examples of the input-output interface 158 include a universal serial bus (USB) terminal, a digital visual interface (DVI) terminal, a high-definition multimedia interface (HDMI, registered trademark) terminal, and various types of processing circuits.

The operation input device 160 is provided, for example, on the information processing device 100, and is connected to the input-output interface 158 within the information processing device 100. Examples of the operation input device 160 include a button, a direction key, a rotation type selector such as a jog dial, and a combination thereof.

The display device 162 is provided, for example, on the information processing device 100, and is connected to the input-output interface 158 within the information processing device 100. Examples of the display device 162 include a liquid crystal display and an organic electro-luminescence display (also referred to as organic EL display or organic light emitting diode display (OLED display)).

The imaging device 164 is provided, for example, on the information processing device 100, and is connected to the input-output interface 158 within the information processing device 100. When the imaging device is provided, it is possible for the information processing device 100 to acquire information relating to the user's gaze based on a captured image that is generated by capturing in the imaging device.

In this regard, the imaging device according to the present embodiment is configured to include, for example, a lens/imaging element and a signal processing circuit. The lens/imaging element is composed of, for example, an optical lens and an image sensor that uses imaging elements such as complementary metal oxide semiconductor (CMOS). The signal processing circuit is provided with, for example, an automatic gain control (AGC) circuit or analog to digital converter (ADC), and converts an analog signal generated by the imaging element into a digital signal (image data). In addition, the signal processing circuit may perform various signal processes including white balance correction processing, color correction processing, gamma correction processing, YCbCr conversion processing, and edge enhancement processing.

It should be understood that the input-output interface 158 is possible to be connected to an external device such as an operation input device (e.g. keyboard and mouse), a display device, or an imaging device, as an external device of the information processing device 100. In addition, the display device 162 may be a device such as a touch panel on which a display process and the user's operation can be performed.

The communication interface 166 is a communication means which is provided in the information processing device 100, and functions as the communication unit 102 for communicating with an external device or external apparatus such as an external imaging device, an external display device, or an external sensor by wire or wireless via a network (or directly). in this regard, examples of the communication interface 166 include a communication antenna and radio frequency (RF) circuit (wireless communication), an IEEE 802.15.1 port and transmission-reception circuit (wireless communication), an IEEE 802.11 port and transmission-reception circuit (wireless communication), or a local area network (LAN) terminal and transmission-reception circuit (wired communication). In addition, examples of the network according to the present embodiment include a wired network such as local area network (LAN) or wide area network (WAN), a wireless network such as wireless local area network (WLAN) or wireless wide area network (WWAN) via a base station, and the Internet using a communication protocol such as transmission control protocol/Internet protocol (TCP/IP).

The information processing device 100 having, for example, the configuration shown in FIG. 16 allows the process of implementing the information processing method according to the present embodiment to be performed. The hardware configuration of the information processing device 100 according to the present embodiment is not limited to the configuration shown in FIG. 16.

For example, the information processing device 100 may be further provided with one or more sensors which serve as a detector (not shown) for acquiring data that can be used in the process of implementing the information processing method according to the present embodiment. Examples of data that can be used in the process of implementing the information processing method according to the present embodiment include data that can be used to improve the estimation accuracy of the user's gaze position.

Examples of the sensor according to the present embodiment include any sensor, such as infrared sensor, capable of acquiring data that can be used in the process of implementing the information processing method according to the present embodiment.

Furthermore, for example, when the information processing device 100 is configured to perform the process as a stand-alone configuration, the information processing device may have a configuration that does not include the communication device 164. In addition, the information processing device 100 can have a configuration that does not include the recording medium 156, the operation device 160, the display device 162, or the imaging device 164.

Referring back to FIG. 15, an exemplary configuration of the information processing device 100 will be described. The communication unit 102 is a communication means provided in the information processing device 100, and communicates with an external device or external apparatus such as an external imaging device, an external display device, or an external sensor by wire or wireless via a network (or directly). In addition, the communication via the communication unit 102 is controlled, for example, by the controller 104.

Examples of the communication unit 102 include a communication antenna and RF circuit or a LAN terminal and transmission-reception circuit, but the configuration of the communication unit 102 is not limited to the above example. As an example, the communication unit 102 can have a configuration compatible with any standard capable of communication such as a USB terminal and transmission-reception circuit or any configuration capable of communication with an external device via a network.

The controller 104 is configured to include, for example, an MPU, and plays a role in controlling the entire information processing device 100. In addition, the controller 104 is provided with, for example, the gaze position acquisition unit 110, the determination unit 112, and the processing unit 114, and plays a leading role in performing the process of implementing the information processing method according to the present embodiment.

The captured-image acquisition unit 110 plays a leading role in performing the process of the above item (1) (gaze position acquisition process) and acquires the user's gaze position.

The determination unit 112 plays a leading role in performing the process of the above item (2) (determination process) and determines whether the gaze position acquired by the captured-image acquisition unit 110 corresponds to the application-related position. More specifically, the determination unit 112 performs, for example, the process corresponding to the determination process among "the determination process and state control process according to the first example described above" through "the determination process and state control process according to the eighth example described above."

The processing unit 114 plays a leading role in performing the process of the above item (3) (state control process) and controls the state of the application when it is determined that the gaze position corresponds to the application-related position in the determination unit 112. More specifically, the processing unit 114 performs, for example, the process corresponding to the state control process among "the determination process and state control process according to the first example described above" through "the determination process and state control process according to the eighth example described above."

The information processing device 100 having a configuration, for example, shown in FIG. 15 allows the process of implementing the information processing method according to the present embodiment (e.g. the process of the above item (1) (gaze position acquisition process), the process of the above item (2) (determination process), and the process of the above item (3) (state control process)) to be performed. In addition, the information processing device 100 having a configuration, for example, shown in FIG. 15 allows the first example of the process of implementing the information processing method according to the present embodiment shown in FIG. 1, the second example of the process of implementing the information processing method according to the present embodiment shown in FIG. 3, and the third example of the process of implementing the information processing method according to the present embodiment shown in FIG. 5 to be performed.

Thus, the information processing device 100 having a configuration, for example, shown in FIG. 15 allows the user to perform an application-related operation using the gaze.

Furthermore, with the configuration, for example, shown in FIG. 15, the information processing device 100 can achieve advantageous effects that are obtained by performing the process of implementing the information processing method according to the present embodiment, for example as described above.

It should be understood that the configuration of the information processing device according to the present embodiment is not limited to the configuration shown in FIG. 15.

As an example, the information processing device according to the present embodiment can be provided with one or more of the gaze position acquisition unit 110, the determination unit 112, and the processing unit 114, as a separate component from the controller 104 (e.g. implementation as a separate processing circuit).

Furthermore, for example, when the communication with an external device or external apparatus is performed via an external communication device having a function and configuration similar to the communication unit 102 or when the information processing device is configured to perform the process as a stand-alone configuration, the information processing device according to the present embodiment may have a configuration that does not include the communication unit 102.

Furthermore, the information processing device according to the present embodiment may be further provided with, for example, an imaging unit (not shown) configured to include an imaging device. When the imaging unit (not shown) is provided, the information processing device according to the present embodiment can acquire information relating to the user's gaze based on a captured image that is generated by capturing in the imaging unit (not shown).

Moreover, the information processing device according to the present embodiment may be further provided with, for example, a detector (not shown) including any sensor capable of acquiring data that can be used in the process of implementing the information processing method according to the present embodiment. When the detector (not shown) is provided, the information processing device according to the present embodiment uses a detection value obtained by the detector (not shown) to perform the process of implementing the information processing method according to the present embodiment.

Although the above description has been given by exemplifying the information processing device, the present embodiment is not limited thereto. The present embodiment is applicable to various types of devices including a see-through or closed-view HMD, a television set, a display device, a tablet device, a communication device such as mobile phone or smartphone, a video/music playback device (or video/music recording and playback device), a game console, and a computer such as PC (desktop PC or notebook PC). In addition, the present embodiment is also applicable to, for example, a processing integrated circuit (IC) that can be incorporated into such a device described above.

Furthermore, the present embodiment may be implemented as a system including a plurality of devices on the assumption that the connection to a network (or communication among devices) such as cloud computing is established. In other words, it is also possible for the information processing device according to the present embodiment described above to be implemented, for example, as an information processing system including a plurality of devices.

Program according to present embodiment

A program for causing a computer to function as the information processing device according to the present embodiment (e.g. program capable of executing the process of implementing the information processing method according to the present embodiment, such as the process of the above item (1) (gaze position acquisition process), the process of the above item (2) (determination process), and the process of the above item (3) (state control process)) is executed by a processor or like device in the computer, and thus it is possible to allow the user to perform an application-related operation using the gaze.

Furthermore, it is possible to achieve advantageous effects obtained by performing the process of implementing the information processing method according to the present embodiment described above by allowing a program for causing a computer to function as the information processing device according to the present embodiment to be executed by a processor or the like in the computer.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it has been illustrated above that a program (computer program) that causes a computer to function as the information processing device according to the present embodiment is provided, but the present embodiment can further provide a recording medium in which the above-described program is stored together.

The above-described configurations express examples of the embodiment and, of course, pertain to the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing device including:

a gaze position acquisition unit configured to acquire a gaze position of a user, a determination unit configured to determine whether the acquired gaze position corresponds to an application-related position; and a processing unit configured, when the gaze position is determined to correspond to the application-related position, to control a state of an application.

(2)
The information processing device according to (1),
wherein the application-related position includes a first position for starting an application,
wherein the determination unit determines whether the gaze position corresponds to the first position, and
wherein the processing unit, when the gaze position is determined to correspond to the first position, starts an application corresponding to the determined first position.

(3)
The information processing device according to (2),
wherein the first position is set for each application, and
wherein the determination unit determines whether the gaze position corresponds to the first position for each first position being set.

(4)
The information processing device according to any one of (1) to (3),
wherein the application-related position includes a second position for terminating an application being started,
wherein the determination unit, when an application is started, determines whether the gaze position corresponds to the second position corresponding to the application being started, and
wherein the processing unit, when the gaze position is determined to correspond to the second position, terminates an application corresponding to the determined second position.

(5)
The information processing device according to (4),
wherein the second position is set for each application, and
wherein the determination unit determines whether the gaze position corresponds to the second position for each second position being set.

(6)
The information processing device according to (1),
wherein the application-related position includes a third position for displaying an object and a fourth position for starting an application associated with a displayed object,
wherein the determination unit
further determines whether an object associated with an application is displayed, and
when the object is not determined to be displayed, determines whether the gaze position corresponds to the third position,
wherein the processing unit, when the gaze position is determined to correspond to the third position, displays the object corresponding to the third position,
wherein the determination unit, when the object is determined to be displayed, determines whether the gaze position corresponds to the fourth position, and
wherein the processing unit, when the gaze position is determined to correspond to the fourth position, starts an application associated with the displayed object.

(7)
The information processing device according to (6),
wherein the processing unit, when the gaze position corresponds to a display position of the object being displayed, displays another object associated with another application instead of the displayed object.

(8)
The information processing device according to (6) or (7),
wherein the processing unit, when the gaze position is not determined to correspond to the fourth position in determining whether the gaze position corresponds to the fourth position in the determination unit, displays another object associated with another application instead of the displayed object at every predetermined time being set.

(9)
The information processing device according to any one of (6) to (8),
wherein the application-related position includes a fifth position for moving the displayed object,
wherein the determination unit, when the object is determined to be displayed, determines whether the gaze position corresponds to the fifth position, and
wherein the processing unit, when the gaze position is determined to correspond to the fifth position, moves the displayed object using a movement method associated with the fifth position.

(10)
The information processing device according to any one of (6) to (9),
wherein the application-related position includes a sixth position for hiding the displayed object,
wherein the determination unit, when the object is determined to be displayed, determines whether the gaze position corresponds to the sixth position, and
wherein the processing unit, when the gaze position is determined to correspond to the sixth position, hides the displayed object.

(11)
An information processing method that is executed by an information processing device, the information processing method including:
a step of acquiring a gaze position of a user;
a step of determining whether the acquired gaze position corresponds to an application-related position; and
a step of controlling, when the gaze position is determined to correspond to the application-related position, a state of an application.

(12)
A program for causing a computer to execute:
a step of acquiring a gaze position of a user,
a step of determining whether the acquired gaze position corresponds to an application-related position; and
a step of controlling, when the gaze position is determined to correspond to the application-related position, a state of an application.

REFERENCE SIGNS LIST 100 information processing device
102 communication unit
104 controller
110 gaze position acquisition unit
112 determination unit
114 processing unit

The invention claimed is:
1. An information processing device comprising:
a gaze position acquisition unit configured to acquire a gaze position of a user;
a determination unit configured to
determine whether an object related to an application is displayed, and
determine, when the object is determined as not being displayed, whether the acquired gaze position corresponds to a predetermined position for displaying the object; and
a processing unit configured to initiate display of the object when the gaze position is determined to correspond to the predetermined position, wherein the gaze position acquisition unit, the determination unit, and the processing unit are each implemented via at least one processor.

2. The information processing device according to claim 1,
wherein the determination unit further determines whether the gaze position corresponds to a first position for starting the application, and
wherein the processing unit, when the gaze position is determined to correspond to the first position, starts the application corresponding to the determined first position.

3. The information processing device according to claim 2,
wherein the first position is set for each application of a plurality of applications, and
wherein the determination unit determines whether the gaze position corresponds to the first position for each first position being set.

4. The information processing device according to claim 2, wherein the determination unit is further configured to determine whether the application has started, and
terminate, when the application has started, the application when the gaze position is determined to correspond to the first position.

5. The information processing device according to claim 1,
wherein the determination unit, when the application is started, determines whether the gaze position corresponds to a second position corresponding to the application being started, and
wherein the processing unit, when the gaze position is determined to correspond to the second position, terminates an application corresponding to the determined second position.

6. The information processing device according to claim 5, wherein the second position is set for each application of the plurality of applications, and
wherein the determination unit determines whether the gaze position corresponds to the second position for each second position being set.

7. The information processing device according to claim 1,
wherein the determination unit, when the object is determined to be displayed, determines whether the gaze position corresponds to a third position for starting the application associated with the displayed object, and
wherein the processing unit, when the gaze position is determined to correspond to the third position, starts the application associated with the displayed object.

8. The information processing device according to claim 7,
wherein the processing unit, when the gaze position corresponds to a display position of the object being displayed, displays another object associated with another application instead of the displayed object.

9. The information processing device according to claim 7,
wherein the processing unit, when the gaze position is determined to not correspond to the third position in determining whether the gaze position corresponds to the third position in the determination unit, displays another object associated with another application instead of the displayed object at a predetermined time.

10. The information processing device according to claim 7,
wherein the determination unit, when the object is determined to be displayed, determines whether the gaze position corresponds to a fourth position for moving the displayed object, and
wherein the processing unit, when the gaze position is determined to correspond to the fourth position, moves the displayed object using a movement method associated with the fourth position.

11. The information processing device according to claim 10, wherein the gaze position acquisition unit is further configured to acquire a direction of gaze of the user, and
the processing unit is further configured to move the displayed object in accordance with the acquired direction of the gaze.

12. The information processing device according to claim 7,
wherein the determination unit, when the object is determined to be displayed, determines whether the gaze position corresponds to a fifth position for hiding the displayed object, and
wherein the processing unit, when the gaze position is determined to correspond to the fifth position, hides the displayed object.

13. An information processing method executed using at least one processor, the information processing method comprising:
acquiring a gaze position of a user;
determining whether an object related to an application is displayed;
determining, when the object is determined as not being displayed, whether the acquired gaze position corresponds to a predetermined position for displaying the object; and
displaying the object when the gaze position is determined to correspond to the predetermined position.

14. A non-transitory computer-readable medium having embodied thereon a program, which when executed by a computer causes the computer to execute a method, the method comprising:
acquiring a gaze position of a user;
determining whether an object related to an application is displayed;
determining, when the object is determined as not being displayed, whether the acquired gaze position corresponds to a predetermined position for displaying the object; and
displaying the object when the gaze position is determined to correspond to the predetermined position.

* * * * *